US012750000B2

(12) United States Patent
Sankrithi

(10) Patent No.: US 12,750,000 B2
(45) Date of Patent: Sep. 29, 2026

(54) SYNERGISTIC TRACKING INTEGRATED PHOTOVOLTAIC AND CONCENTRATING COGENERATION SOLAR ENERGY HARVESTING SYSTEM

(71) Applicant: Mithra Sankrithi, Bremerton, WA (US)

(72) Inventor: Mithra Sankrithi, Bremerton, WA (US)

(73) Assignee: RIC Enterprises, Bremerton, WA (US)

( * ) Notice: Subject to any disclaimer, the term of this patent is extended or adjusted under 35 U.S.C. 154(b) by 45 days.

(21) Appl. No.: 18/816,697

(22) Filed: Aug. 27, 2024

(65) Prior Publication Data

US 2026/0066834 A1 Mar. 5, 2026

(51) Int. Cl.

| | |
|---|---|
| ***H02S 10/12*** | (2014.01) |
| ***F03B 13/14*** | (2006.01) |
| ***F24S 23/77*** | (2018.01) |
| ***H02S 20/32*** | (2014.01) |
| ***H02S 30/10*** | (2014.01) |
| ***H02S 40/22*** | (2014.01) |
| *F24S 23/70* | (2018.01) |
| *F24S 50/20* | (2018.01) |
| *H02S 20/23* | (2014.01) |

(52) U.S. Cl.

CPC .............. *H02S 10/12* (2014.12); *F03B 13/14* (2013.01); *F24S 23/77* (2018.05); *H02S 20/32* (2014.12); *H02S 30/10* (2014.12); *H02S 40/22* (2014.12); *F24S 2023/84* (2018.05); *F24S 50/20* (2018.05); *H02S 20/23* (2014.12)

(58) Field of Classification Search

None

See application file for complete search history.

(56) References Cited

U.S. PATENT DOCUMENTS

| | | | | |
|---|---|---|---|---|
| 6,363,928 B1 * | 4/2002 | Anderson, Jr. | ......... | F24S 20/55 126/606 |
| 2011/0132434 A1 * | 6/2011 | Correia | ................... | F24S 25/00 257/E31.001 |
| 2011/0277815 A1 * | 11/2011 | Sankrithi | ................ | F24S 23/74 136/246 |
| 2012/0180849 A1 * | 7/2012 | Bettencourt | ........... | B01J 19/127 136/248 |
| 2021/0197934 A1 * | 7/2021 | An | .......................... | B63B 35/38 |

* cited by examiner

*Primary Examiner* — Ryan S Cannon

(57) ABSTRACT

The invention provides a new class of solar energy harvesting devices that integrate both photovoltaic and concentrating solar cogeneration systems with shared heliostatic tracking in an inventive manner that enables synergistic benefits and overall optimization. Roof, ground & water supported preferred embodiments provide benefits for varied applications. The new class of synergistic tracking integrated photovoltaic and concentrating solar energy harvesting systems comprise systems that encompass both (i) a nonconcentrating photovoltaic system such as a solar panel and (ii) a concentrating cogeneration system that includes a concentrating photovoltaic (CPV) receiver and a heat transfer subsystem, wherein the two systems (i) and (ii) share heliostatic tracking provided by a tracking subsystem and are inventively integrated physically and operationally to enable benefits in terms of solar energy harvest efficiency, space-efficiency, cost-effectiveness and lifecycle cost of energy, while minimizing or precluding shadowing losses and enabling further benefits.

20 Claims, 20 Drawing Sheets

SYNERGISTIC TRACKING INTEGRATED PHOTOVOLTAIC AND CONCENTRATING COGENERATION SOLAR ENERGY HARVESTING SYSTEM

BACKGROUND OF THE INVENTION

The deployment of solar energy harvesting systems is increasing as they offer increasingly cost-effective options to serve humankind's energy needs, while beneficially avoiding the use of carbon-emitting fossil fuel sources which aggravate the onerous consequences of anthropogenic climate change. A prime example of solar energy harvesting systems in the current state-of-the-art comprises a class of simple nontracking photovoltaic or PV systems such as solar panels, that convert solar energy to electrical energy, but with low nominal efficiency levels typically in the 15 to 25% range. Many solar heating systems also exist in the prior art, and some concentrating solar cogeneration systems that harvest both electrical energy and usable heat energy have also been documented, such as in U.S. Pat. Nos. 7,997,264 and 9,404,677 (Ref.s 1, 2). However, the prior art does not disclose guidance to preferred embodiments of systems or methods that physically and operatively integrate both photovoltaic and concentrating solar cogeneration subsystems with shared heliostatic tracking in an inventive manner that enables synergistic benefits and overall optimization to create preferred solar energy harvesting systems for a variety of roof, land and water-based applications and constraints.

BRIEF SUMMARY OF THE INVENTION

In summary, this invention provides for a new class of synergistic tracking integrated photovoltaic and concentrating solar energy harvesting system that can inventively provide optimal solutions for a variety of roof, land and water-based solar energy applications and constraints, and with optimization with respect to a variety of measures of merit and objective functions. The new class of synergistic tracking integrated photovoltaic and concentrating solar energy harvesting systems comprise systems that encompass both (i) a nonconcentrating photovoltaic system such as a solar panel and (ii) a concentrating cogeneration system that includes a concentrating photovoltaic (CPV) receiver and a heat transfer subsystem, wherein the two subsystems (i) and (ii) share heliostatic tracking provided by a tracking subsystem and are inventively integrated physically and operatively to enable benefits in terms of solar energy capture, power harvest efficiency, space efficiency and cost-effectiveness, while minimizing or precluding shadowing losses. Key exemplary measures of merit for space efficiency are the solar energy harvest or rated power of the system per unit plan view area (comprising roof, land and/or water area) of the installed system. A key exemplary measure of cost-effectiveness is lifecycle cost of energy (LCOE), while capital cost per rated energy harvest over a time interval is also a key cost-effectiveness metric. A key exemplary measure of merit for minimizing shadowing loss is to minimize the % annual energy harvest loss that can be attributed to shadowing over the course of normal operation of the system over a whole year under ideal conditions of full Sun and neglecting cloud cover effects, and wherein the shadowing loss categories included include shadowing attributable to subsystem (i) as well as shadowing attributable to subsystem (ii). With the new invention presented herein, the percentage of incoming solar energy that is harvested can be greatly increased relative to either purely photovoltaic or purely solar thermal harvesting systems, and measures of merit as described above and further including weight metrics, additional cost metrics, simplicity metrics, reliability metrics, maintainability metrics, robustness metrics and additional lifecycle metrics, can collectively be optimized with multiobjective optimization. The following descriptive portion of the specification along with the figures and claims, will more fully explain the invention and how the described preferred embodiments and methods enable benefits considering various measures of merit, for a variety of applications and constraints.

DETAILED DESCRIPTION OF THE INVENTION

Figure 1A:
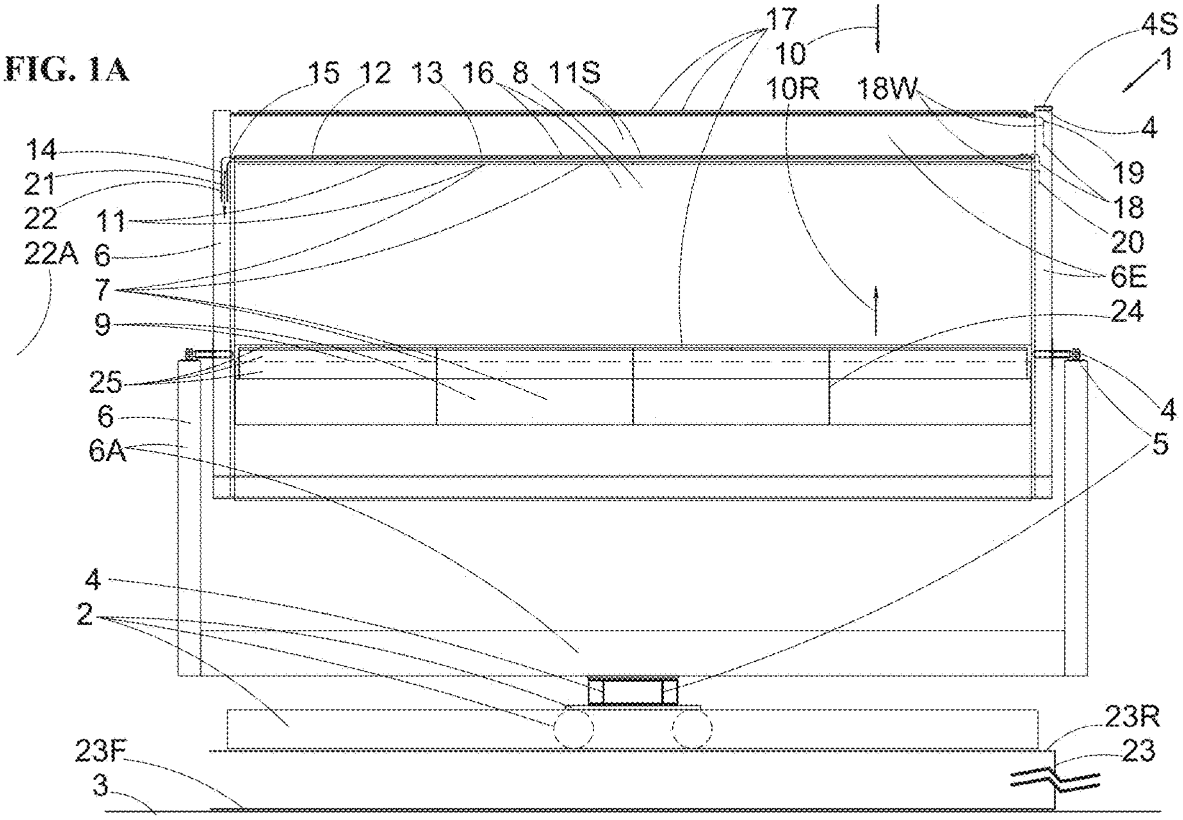
FIG. 1A shows a front side view of a preferred embodiment of a tracking integrated photovoltaic and concentrating solar energy harvesting module.
Figure 1B:
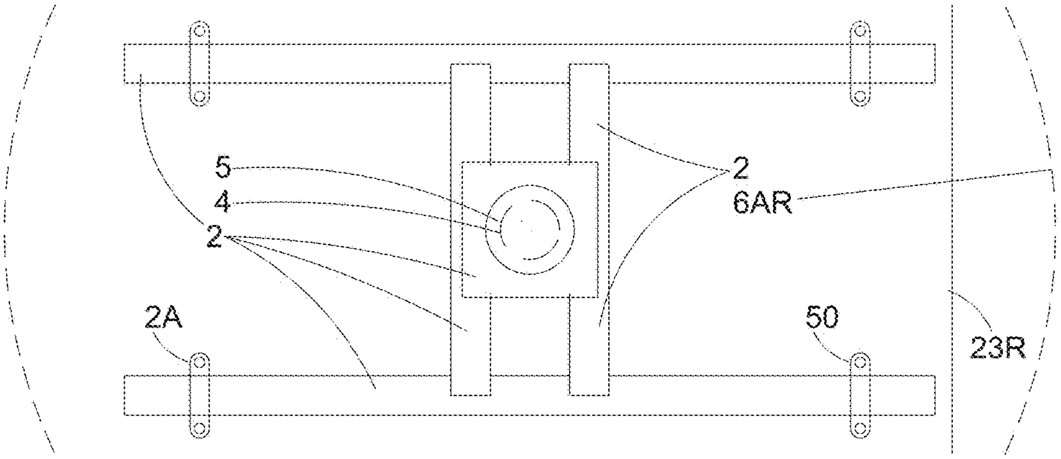
FIG. 1B shows a normal-to-roof plan view of support structure for the embodiment of FIG. 1A.
Figure 1C:
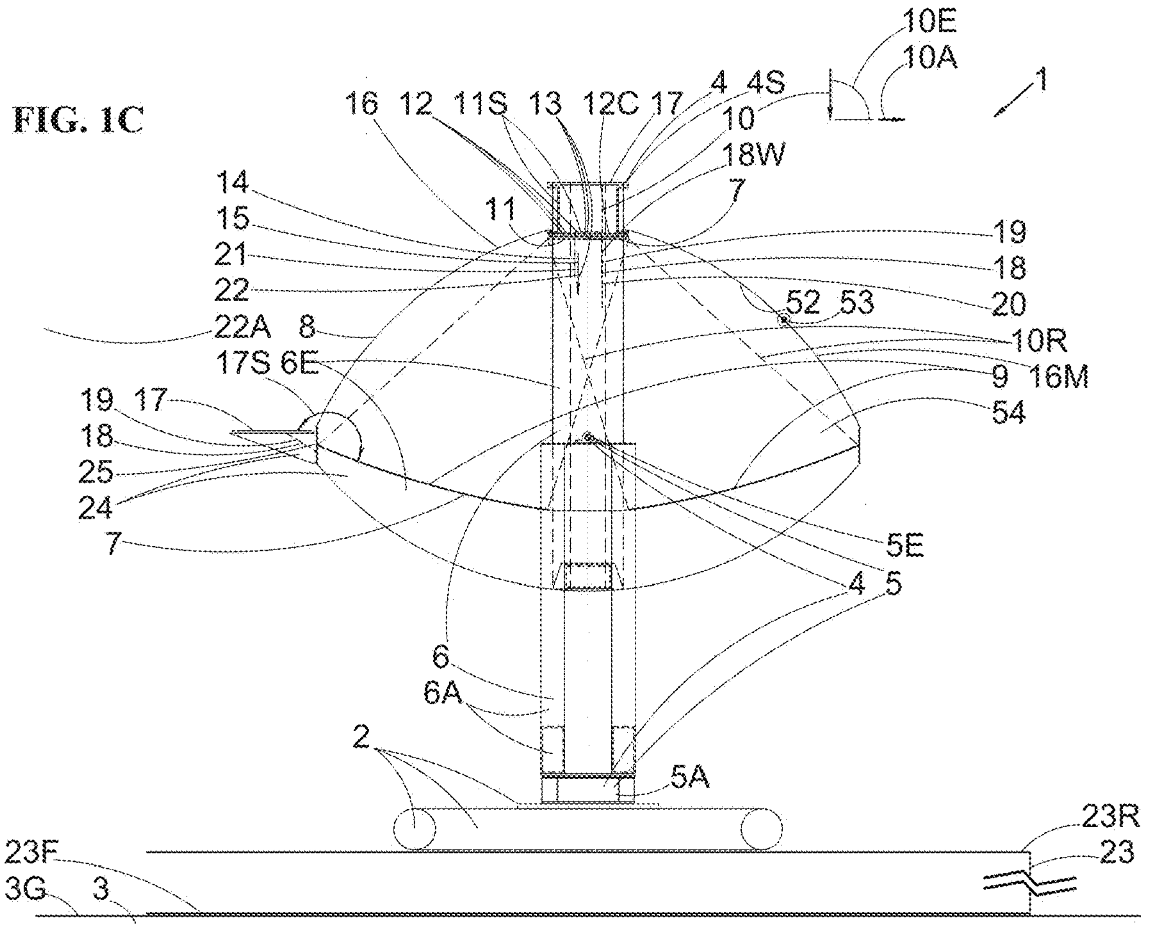
FIG. 1C shows an end view of the embodiment of FIG. 1A.

FIG. 1A shows a front side view of a preferred embodiment of a tracking integrated photovoltaic and concentrating solar energy harvesting module. FIG. 1B shows a normal-to-roof plan view of support structure for the embodiment of FIG. 1A. FIG. 1C shows an end view of the embodiment of FIG. 1A. While FIG. 1C shows a linear concentrating photovoltaic receiver 11 that is centered relative to the illustrated linear concentrating reflective surface 9, it will be understood that variant embodiments can have a linear concentrating photovoltaic receiver 11 slightly, partially, fully or more than fully offset from the center of the linear concentrating reflective surface 9, with appropriate shaping of the linear concentrating reflective surface 9 so that it still reflects and concentrates incoming sunlight to fall substantially uniformly on the concentrating photovoltaic (CPV) receiving surface of the linear concentrating photovoltaic receiver 11.

FIGS. 1A, 1B and 1C together illustrate a hybrid renewable energy harvesting system 1 that includes support structure 2 and a frame 6, both of which can use a variety of materials, structural architectures and structural components and assemblies known from the prior art. Examples of materials include metals, plastics, HDPE, ETFE, composites, wood, and other materials or material systems; examples of structural architectures and structural components include beams, extrusions, plates, stiffened plates, spars, ribs, stringers, frames, bulkheads, doublers, membranes, trusses, grid architectures, spiral wound architecture, sandwich architectures, topology optimized structural architectures, forged architectures, joints, welded architectures, fastened architectures, bonded architectures, other architectures, structural assemblies, fasteners, fittings, connectors and other structural components. FIGS. 1A, 1B and 1C also together illustrate a hybrid renewable energy harvesting system 1 that comprises both a photovoltaic panel 17 (that comprises a nonconcentrating photovoltaic system such as a solar panel for harvesting electricity from solar energy) and a solar cogeneration system 7 (for harvesting both electricity and usable heat from solar energy), with a heliostatic tracking system 4 that moves both the photovoltaic panel 17 and the solar cogeneration system 7 to increase energy harvest (relative to the no-tracking case) as the Sun executes its apparent movement through the sky with solar radiation (sunlight 10) coming from different combinations of solar azimuth angle 10A and solar elevation angle 10E as a function of time of day (or more specifically solar time) as well as time of year and location & latitude of the installation site. Note that conventionally “solar azimuth angle” is an angle measured clockwise from North in plan view, to the vector Sun direction, and “solar elevation angle” is an angle measured from the local horizontal Earth plane up to the vector Sun direction. The representative solar azimuth angle shown in FIGS. 1A, 1B and 1C is 180 degrees (due South) and the representative solar elevation angle shown in FIGS. 1A, 1B and 1C is 90 degrees (straight up), without limitation. Photovoltaic panels 17 can also be called ‘PV panels’ and may typically but not always comprise a group of plural solar cells arranged in a substantially linear or planar arrangement. A photovoltaic panel 17 can use any of a wide variety of solar cells can be used including one or more selected from: monocrystalline silicon solar cells, polycrystalline silicon solar cells, amorphous silicon solar cells, organic photovoltaics, perovskites, cadmium telluride solar cells, copper indium gallium selenide solar cells, quantum dots, heterojunction solar cells, hybrid solar cells, biohybrid solar cells, passivated emitter and rear contact solar cells, thin film solar and other solar cells. In the illustrated embodiment the photovoltaic panels 17 are provided both (i) on the sunward side of the member of the elevation rotating frame 6E that is closest to the Sun and the incoming sunlight 10 (as shown in FIG. 1A), and (ii) a laterally spaced location with spacing 17S, relative to the linear concentrating reflective surface 9 (as shown in FIG. 1C). The preferred embodiment of FIGS. 1A, 1B and 1C uses two axis heliostatic tracking, with a heliostatic tracking system 4 that commands a controllable actuation system 5, comprising in combination a heliostatic azimuth tracking subsystem 4A with an azimuth actuation subsystem 5A and a heliostatic elevation tracking subsystem 4E with an elevation actuation subsystem 5E. The heliostatic tracking system 4 and controllable actuation system 5 can include one or more of: a motor, a gearmotor, a stepper motor, a linear actuator, a rotary actuator, a mechanism, a gear, a linkage, a belt, a toothed belt, a chain, a driveshaft, a structural member, a power member, an electrical member, an electromechanical member, a hydraulic member, a pneumatic member, and a communication member.

The heliostatic tracking system in the illustrated embodiment of FIGS. 1A, 1B and 1C receives Sun angle information from a sun sensor 4S, but it will be understood that in variant embodiments without a sun sensor, Sun angle information can be stored in a dataset or data table with appropriate ‘Sun Table’ type data for a specific installation geographic location (e.g. latitude), specific time (time of year, date and solar time/time of day), and specific base installation angles (elevation, azimuth) as known in the art. The azimuth actuation subsystem 4A is configured to rotate the azimuth rotating frame 6A to assume different azimuth angles tracking solar azimuth angle. The elevation actuation subsystem 6E is configured to rotate the elevation rotating frame 6E to assume different elevation angles tracking solar elevation angle. The solar cogeneration system 7 can utilize a linear concentrating reflective surface 9 covered by a reflective surface protection system 8 that can utilize a transparent surface such as an ETFE membrane in tension, without limitation. ETFE membranes have desirable design and operational attributes in terms of transparency, strength, cost-effectiveness, low gas permeability, patch-ability and self-cleaning with rain wash. The reflective surface protection system can optionally utilize inflation in an inflatable volume to support the reflective surface protection system 8, as for example disclosed in prior art References 1 and 2. A valve or self-inflating valve can be used to inflate the inflatable volume, and a pressure sensor can optionally be furnished along with a manual or automated inflation control subsystem. The linear concentrating reflective surface 9 reflects sunlight 10 and concentrates it to fall substantially uniformly on a linear concentrating solar receiver 11, that converts some of the received concentrated solar energy into electrical energy using concentrated photovoltaic (CPV) members such as solar cells. The CPV members such as solar cells of the linear concentrating solar receiver 11 can use any of a wide variety of solar cells including one or more selected from: monocrystalline silicon solar cells, polycrystalline silicon solar cells, amorphous silicon solar cells, organic photovoltaics, perovskites, cadmium telluride solar cells, copper indium gallium selenide solar cells, quantum dots, heterojunction solar cells, hybrid solar cells, biohybrid solar cells, passivated emitter and rear contact solar cells, thin film solar and other solar cells. Plural solar cell types can optionally be used, for example a lower cost lower temperature capable solar cell for an installation location with a lower design maximum temperature, and a less inexpensive but higher temperature capable solar cell for an installation location with a higher design maximum temperature. The solar cogeneration system 7 further comprises a heat transfer subsystem 12 that transfers heat energy 13 from behind (above) the downward facing CPV members of the linear concentrating solar receiver 11, to be carried as usable heat energy 14 in a heat transfer fluid 15. The heat transfer subsystem can use one or more channels (such as extruded metal heat sink extrusions, heat transfer extrusions, heat exchanger members or microchannel extrusions, for example and without limitation) for pumped heat transfer fluid to flow behind the CPV members, receiving heat through low-loss heat conduction from the CPV members through high conductivity materials and layer(s) using copper, aluminum, thermal conduction paste, thermal conduction tape, and/or other heat conductive layer, without limitation. Thus inventively configured, the illustrated preferred embodiment of a tracking integrated photovoltaic and concentrating solar energy harvesting module can harvest much more of the energy in the incoming sunlight 10 than in prior art purely photovoltaic or purely solar thermal energy harvesting devices. More specifically, where a conventional solar panel might harvest 15-25% of incoming solar energy as electricity and waste the remaining 85-75% as waste heat, the present preferred embodiment could potentially harvest 25% of incoming solar energy as electric energy 18 (with electric energy 18 harvested by both the photovoltaic panel 17 and the solar cogeneration system 7) plus 50% of incoming solar energy as usable heat energy 14 for a total 75% solar energy harvest efficiency, with all the above cited percentages representative and not to be taken as limiting. This inventive approach to approximately tripling solar energy harvest is one of the key benefits of the present invention as described and claimed. With the two-axis heliostatic tracking provided in the illustrated embodiment, the high efficiency of solar energy harvest can occur not just at solar noon but during all sunshine periods between dawn and dusk, resulting in substantially improved renewable energy capacity factor, as will be understood by those knowledgeable in the science of renewable energy. While FIGS. 1A, 1B and 1C show a preferred embodiment that is roof-mounted on a building roof 23R that is a flat roof above a ground surface 3G of an Earth layer 3, it should be understood that alternate embodiments could be mounted on a sloping roof or that are non-roof-mounted (e.g. ground or water supported, without limitation) within the spirit and scope of the invention as described and claimed.

Together, FIGS. 1A, 1B and 1C illustrate a hybrid renewable energy harvesting system 1 comprising in combination: a support structure 2 configured to be located above an Earth layer 3; a heliostatic tracking system 4 with a controllable actuation system 5 for moving a frame 6 to track apparent Sun motion above said Earth layer 3, said heliostatic tracking system 4 connected to said support structure 2; a solar cogeneration system 7 connected to said frame 6, wherein said solar cogeneration system 7 comprises in combination: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; a reflective surface protection system 8 comprising a transparent surface 16 connected to said frame 6 and located at least partially above said linear concentrating reflective surface 9 when said heliostatic tracking system 4 is operating to track said apparent Sun motion; and a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

Together, FIGS. 1A, 1B and 1C also illustrate a hybrid renewable energy harvesting system 1, wherein said controllable actuation system 5 further comprises an elevation actuation subsystem 5E configured to enable a range of positive and negative elevation angle orientations for both (i) said linear concentrating reflective surface 9 and (ii) said photovoltaic panel 17.

Please note that we assume a sign convention wherein an upward or sunward elevation angle is positive, and wherein an at least partially downward facing photovoltaic panel 17 or linear concentrating reflective surface 9 are assumed to have an orientation corresponding with a negative elevation angle. Needless to say, sign convention does not affect the invention as described and claimed.

Together, FIGS. 1A, 1B and 1C also illustrate a hybrid renewable energy harvesting system 1, wherein said transparent surface 16 is at least one of a transparent membrane 16M and a transparent flexible surface 16F, and wherein said reflective surface protection system 8 further comprises a transparent surface tensioning subsystem 52 configured to maintain a tension force 53 acting on said transparent surface 16, and wherein said transparent surface tensioning subsystem 52 comprises at least one of (i) a portion of said frame 6 comprising edge frame members 6F configured to enable tensioned support to plural edges 16E of said transparent surface 16, and (ii) an inflatable volume 54 (shown) on at least one side of said transparent surface 16.

Together, FIGS. 1A, 1B and 1C also illustrate a hybrid renewable energy harvesting system 1, wherein said support structure 2 further comprises fittings 50 configured to enable said support structure 2 to be attached to at least one of a building roof 23R (shown) and a ground surface 3G.

Examples of such fittings 50 for roof installations include a wide variety of solar panel roof mounting fittings known in the state-of-the-art, such as brackets, clamps, adjustable clamps, quick penetration mounts, mounts with flashing, posts, rails, fasteners, and racking systems, for example and without limitation. Examples of such fittings 50 for ground installations include ground screws, ground anchors and concrete anchors, for example and without limitation.

Figure 1D:
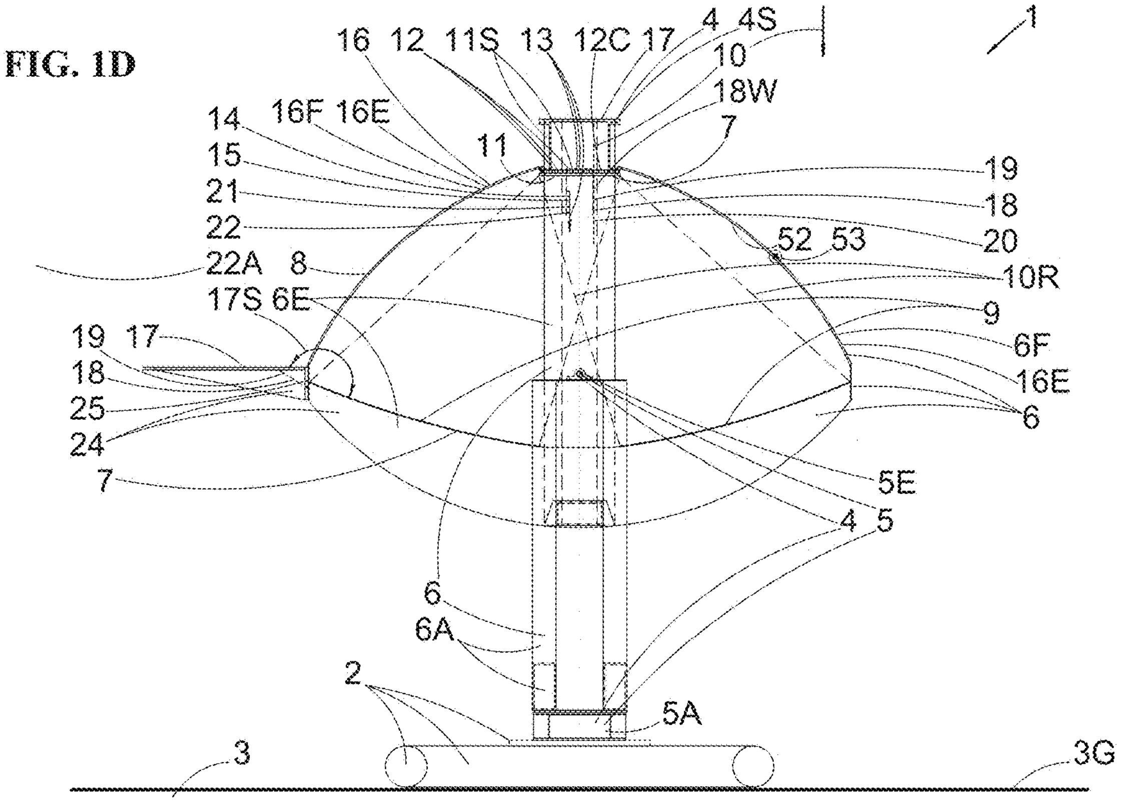
FIG. 1D shows and end view of a preferred embodiment similar to that of FIG. 1C, but with mounting on a ground surface as opposed to a building roof.

FIG. 1D also shows an embodiment incorporating a larger width photovoltaic panel 17 shown at the left side of the Figure. FIG. 1D thus illustrates a hybrid renewable energy harvesting system 1, wherein said support structure 2 further comprises fittings 50 configured to enable said support structure 2 to be attached to at least one of a building roof 23R and a ground surface 3G (shown). It should be understood that certain preferred embodiments may be designed for alternate installations on either or both a ground surface or a roof surface (including flat and sloped surfaces for either). Note that for a home or building that already has conventional solar panels installed on a (pure or partial) South-facing sloped roof (for Northern Hemisphere installations, opposite for Southern Hemisphere installations), modules of the current invention can be very beneficially installed on a (pure or partial) North-facing sloped roof (for Northern Hemisphere installations, opposite for Southern Hemisphere installations) to enable much increased beneficial solar energy harvest (both electricity and usable heat) for a given roof area and configuration.

FIG. 1D also illustrates a hybrid renewable energy harvesting system 1, wherein said transparent surface 16 is at least one of a transparent membrane 16M and a transparent flexible surface 16F, and wherein said reflective surface protection system 8 further comprises a transparent surface tensioning subsystem 52 configured to maintain a tension force 53 acting on said transparent surface 16, and wherein said transparent surface tensioning subsystem 52 comprises at least one of (i) a portion of said frame 6 comprising edge frame members 6F (shown) configured to enable tensioned support to plural edges 16E of said transparent surface 16, and (ii) an inflatable volume 54 on at least one side of said transparent surface 16.

FIGS. 1C & 1D show two representative kinds of surface tensioning subsystems 52 as described and illustrated. It should be understood that variant embodiments may have both instead of one or another, and/or use other surface tensioning subsystems and devices and methods known from the prior art for tensioning membrane or membrane-like sheet or thin panel members.

Figure 1E:
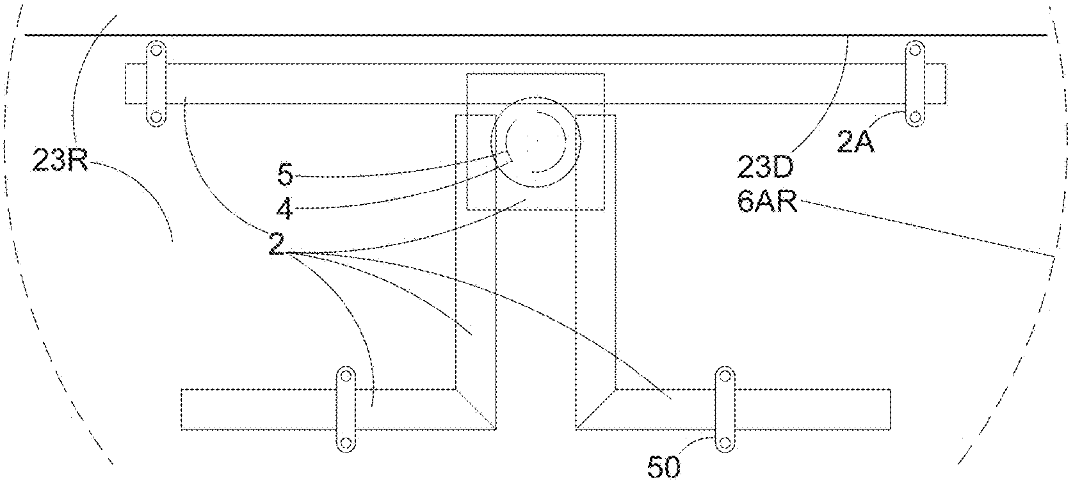
FIG. 1E shows a normal-to-roof plan view of a variant support structure relative to that shown in FIG. 1B, installed on a sloping roof below a roof ridge.
Figure 1F:
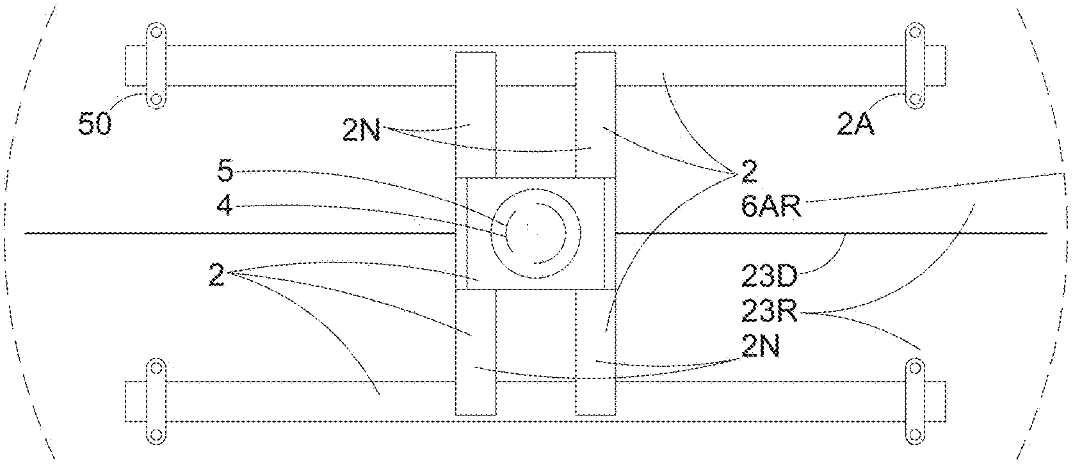
FIG. 1F shows a plan view of a variant support structure relative to those shown in FIG. 1B and FIG. 1E.
Figure 1G:
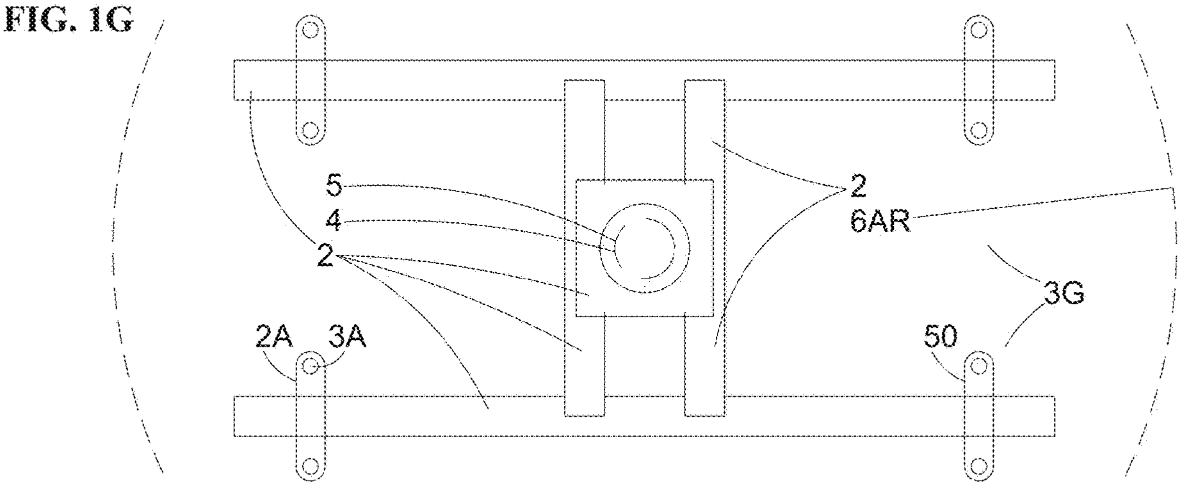
FIG. 1G shows a normal to ground surface view of a ground supported and anchored support structure for a preferred embodiment of a tracking integrated photovoltaic and concentrating solar energy harvesting module.

FIG. 1E shows a normal-to-roof plan view of a variant support structure relative to that shown in FIG. 1B, installed on a sloping roof below a roof ridge. FIG. 1F shows a plan view of a variant support structure relative to those shown in FIG. 1B and FIG. 1E. FIG. 1G shows a normal to ground surface view of a ground supported and anchored support structure for a preferred embodiment of a tracking integrated photovoltaic and concentrating solar energy harvesting module.

FIG. 1E shows a variant support structure installed on a building roof 23R on one side of a roof ridge 23D. The hold down attachment fittings 2A and support ribs 24 can be located appropriately to connect loads into rafter and/or beam structure under the building roof 23R. Rafter or beam sistering can be used if and when the roof support structure lacks sufficient original strength. It should be noted again here that an installation as shown in FIG. 1E, when on a north-facing sloped roof in the Northern Hemisphere (or south-facing sloped roof in the Southern Hemisphere), can be beneficially used to maximize solar energy harvest from available roof area, when conventional nontracking solar panels have been installed as they typically are, on the south-facing sloped roof in the Northern Hemisphere (or north-facing sloped roof in the Southern Hemisphere). In such a case the hybrid renewable energy harvesting system 1 installations, which with heliostatic tracking can "see" the Sun over the roof ridge 23D, are additive and complementary to the conventional solar panels installed on a different portion of roof area, while cost-effectiveness can be enhanced by using shared components and subsystems such as wiring, electric power devices such as inverters and power point trackers and safety elements, grounding elements, control panels for information and command interfaces with homeowners or users, hot water heaters, plumbing, and other equipment and systems and subsystems.

FIG. 1F shows a variant preferred embodiment with support structure installed on a building roof 23R that spans across both side of a roof ridge 23D, as shown. Angled support beams 2N in the support structure 2 enable the hybrid renewable energy harvesting system 1 to be located above said roof ridge 23D.

FIG. 1G shows a variant preferred embodiment of the invention wherein support structure 2 is installed on a ground surface 3G, similar in some respects to the ground-mounting illustrated in FIG. 1D. FIG. 1G shows the use of fittings 50 that are hold-down attachment fittings 2A, with ground anchors 3G that can be screw anchors or anchored bolts or other anchor fittings or Earth-connection fittings or concrete anchors, for example and without limitation.

Figure 2A:
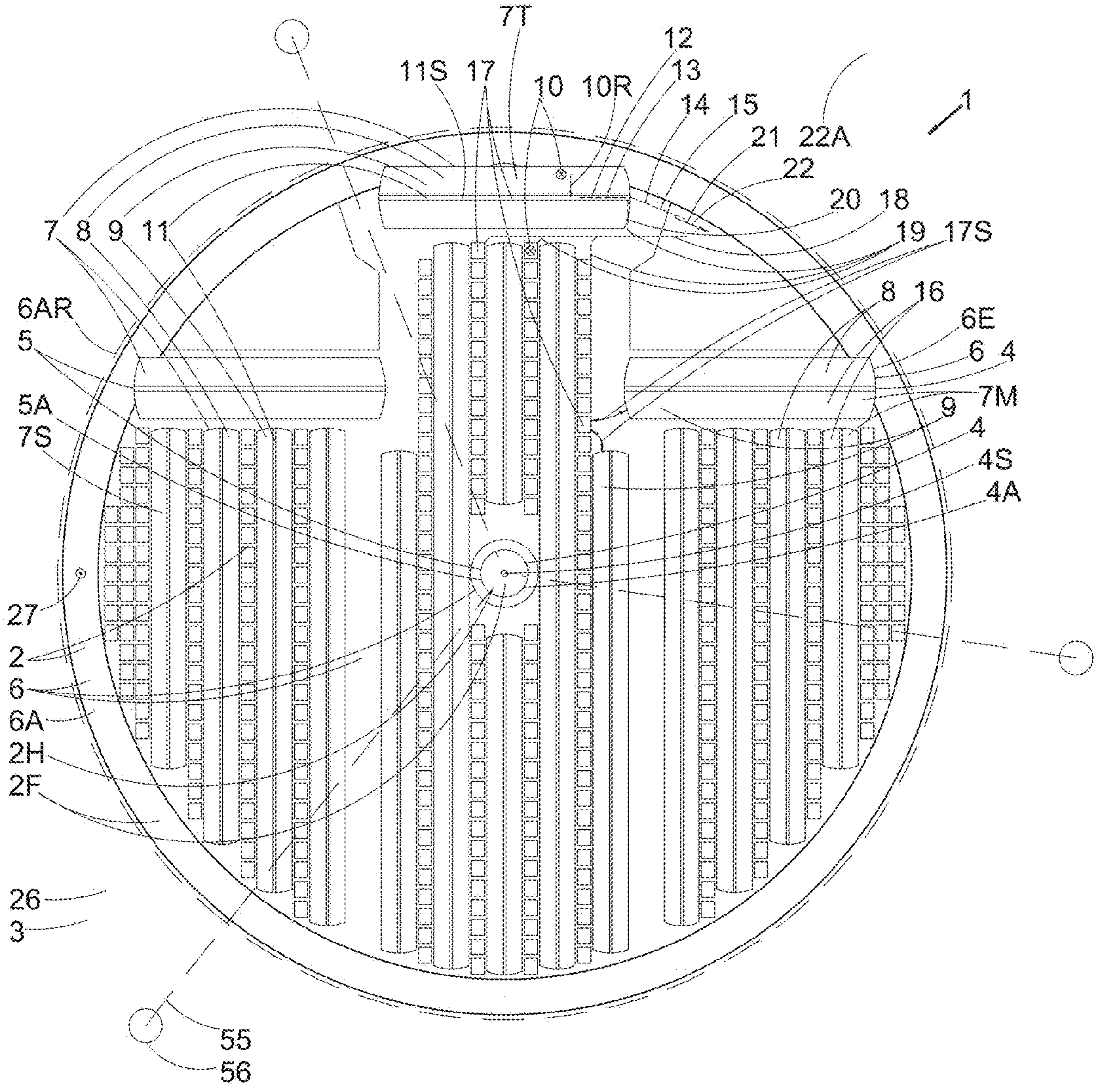
FIGS. 2A, 2B and 2C show plan views of some preferred embodiments of tracking integrated photovoltaic and concentrating solar energy harvesting systems supported at least in part by a hydrostatic support force on a water layer.
Figure 2B:
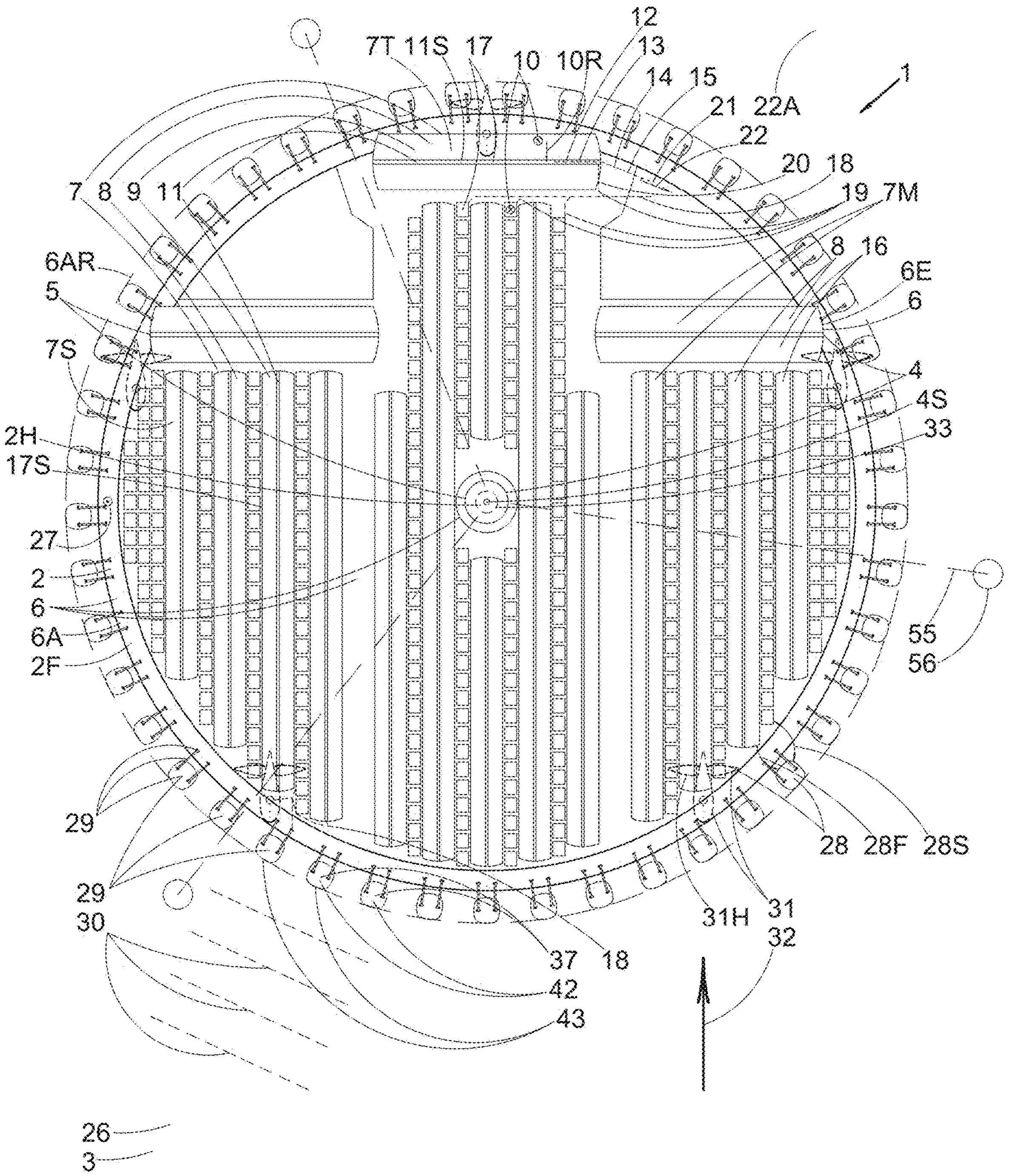
Figure 2C:
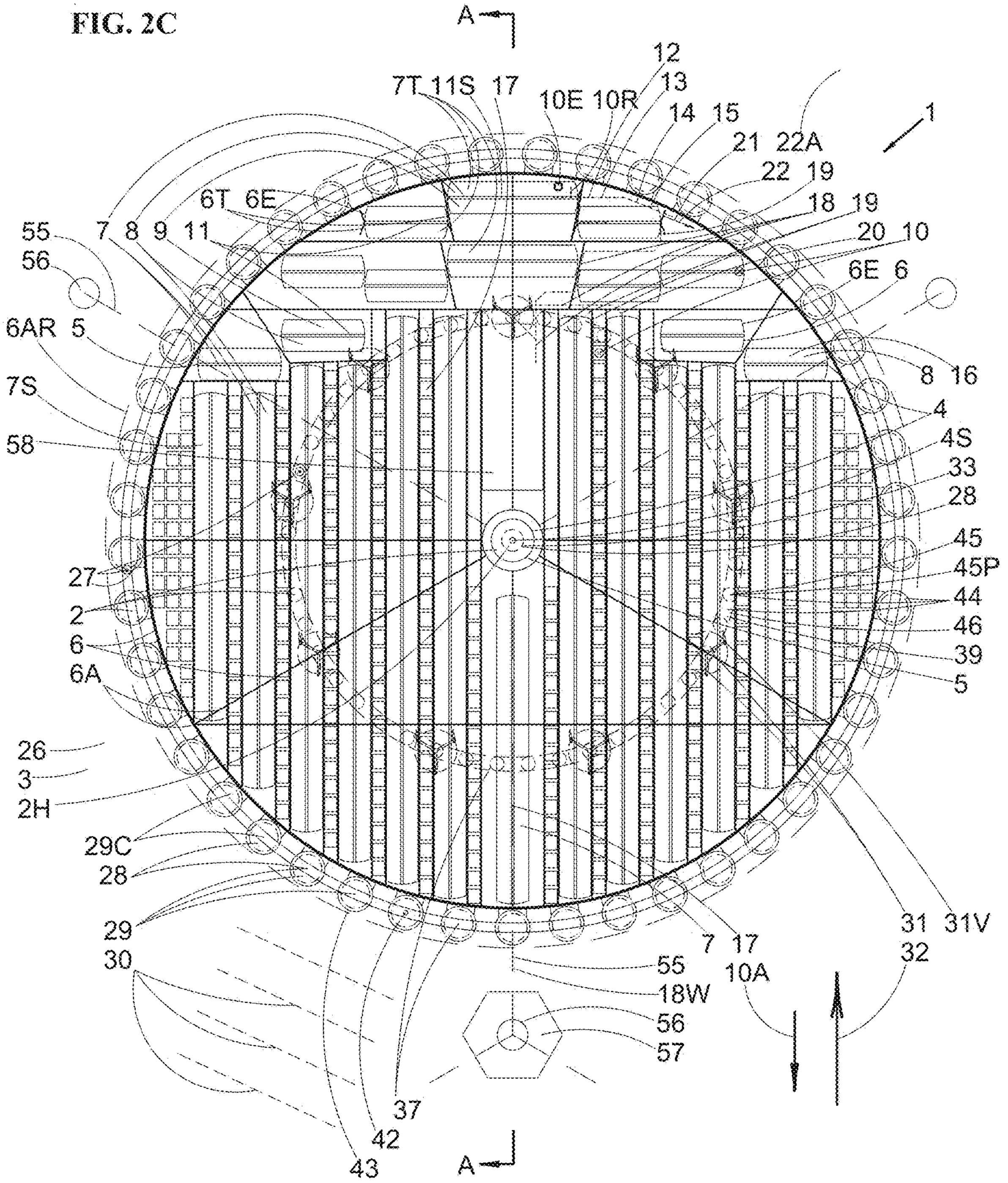

FIGS. 2A, 2B and 2C show plan views of some preferred embodiments of tracking integrated photovoltaic and concentrating solar energy harvesting systems supported at least in part by a hydrostatic support force 27 on a water layer 26. The hydrostatic support force is a buoyancy force created by water displacement. While one floating embodiment could use plural hybrid renewable energy harvesting systems 1 of the type described with reference to FIGS. 1A-1F mounted on a shared floating platform while retaining individual two axis heliostatic tracking of each system, the preferred embodiments shown in FIGS. 2A, 2B and 2C feature sharing of a common azimuth tracking subsystem that acts on a platform that supports multiple photovoltaic panels 17 and multiple solar cogeneration modules 7M in combination, as will be described below.

FIG. 2A shows a hybrid renewable energy harvesting system 1 floating on a water layer 26, with an anchored hub 2H tethered in place within a geographic envelope by at least one tether member 55 that is anchored to an Earth layer 3 by an Earth-fixed base 56; with three tether members and three corresponding Earth-fixed bases illustrated at 120 degree spacing shown in the illustrated embodiment. It will be understood that alternate preferred floating tethered embodiments of a hybrid renewable energy harvesting system 1 may use any number and geometry of tether members 55 and Earth-fixed bases 56, and that adjacent or proximal hybrid renewable energy harvesting systems may share one or more common Earth-fixed bases and/or tether members. Tether members may incorporate one or more of cables or ropes or cords or chains or other tension members, and may utilize braided or woven members and a wide variety of nonmetallic and/or metallic and/or natural materials and material systems as well as one or more of stretchable or elastic or bungee members and sheathing layers and sheathing systems and conducting wire members and insulation members and systems and signal transmission subsystems such as one or more of an electrical signal transmission line and an optical signal transmission line. Upper and lower attachment fittings of a wide variety known in the art can also be utilized. Earth-fixed bases may utilize a wide variety of ground fixation devices and systems known from the prior art, including anchors, ground anchors, concrete anchors, stakes, ground screws, gravity anchors, ballast bases, pile anchors, torpedo anchors, drag anchors and suction anchors. A heliostatic tracking system 4 with a heliostatic azimuth tracking subsystem 4A rotates floatation structure 2F and support structure 2 around an anchored hub 2H by using a controllable actuation system 5 with an azimuth actuation subsystem 5A as illustrated. The controllable actuation system 5 can utilize a wide variety of actuation members and technologies known from the prior art, including one or more of an electric motor, an electric rotary actuator, an electric gearmotor, a stepper motor, an electric linear actuator, a hydraulic actuator, a hydraulic rotary actuator, a hydraulic linear actuator, a pneumatic actuator, a shape memory actuator, and other technology actuator or actuation subsystem, as well as associated gear and linkage members. An optional sun sensor 4S can provide polar angles (e.g., elevation angle, azimuth angle) to the Sun at any given time. In alternate embodiments it should be understood that polar angles to the Sun may be provided by data tables or algorithms for Sun angle as a function of geographic location (latitude, longitude, radius from center of the Earth) and time of year and time of day (such as solar time), without needing the optional sun sensor. The support structure 2 with a frame 6, support plural members of the hybrid renewable energy harvesting system 1 including photovoltaic panels 17 and solar cogeneration systems 7 with heliostatic tracking for both the photovoltaic panels 17 and the solar cogeneration systems 7 being provided by said heliostatic tracking system 4.

More specifically, FIG. 2A illustrates a hybrid renewable energy harvesting system 1 comprising in combination: a support structure 2 configured to be located above an Earth layer 3; a heliostatic tracking system 4 with a controllable actuation system 5 for moving a frame 6 to track apparent Sun motion above said Earth layer 3, said heliostatic tracking system 4 connected to said support structure 2; a solar cogeneration system 7 connected to said frame 6, wherein said solar cogeneration system 7 comprises in combination: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; a reflective surface protection system 8 comprising a transparent surface 16 connected to said frame 6 and located at least partially above said linear concentrating reflective surface 9 when said heliostatic tracking system 4 is operating to track said apparent Sun motion; and a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIG. 2A further illustrates a hybrid renewable energy harvesting system 1 comprising in combination:

- a support structure 2 configured to be supported at least in part by a hydrostatic support force 27 arising from water displacement in a water layer 26 above an Earth layer 3;
- a heliostatic tracking system 4 with a controllable actuation system 5 for moving a frame 6 to track apparent Sun motion above said Earth layer 3;
- a solar cogeneration system 7 connected to said frame 6 and receiving support from said support structure 2, wherein said solar cogeneration system 7 includes a solar cogeneration module 7M comprising: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; and
- a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

It should be noted that the preferred embodiment of the invention as illustrated in FIG. 2A includes a solar cogeneration system 7 with solar cogeneration modules 7M which comprise both a solar cogeneration module with single axis tracking 7S and a solar cogeneration module with two axis tracking 7T. It should also be noted that the photovoltaic panels 17 could be mounted on the frame 6 with a purely upward facing orientation as shown, or in slightly modified preferred embodiments the photovoltaic panels 17 could be mounted on the frame 6 with a fixed tilt or seasonally adjustable tilt towards a sunward direction such as a southward tilt at solar noon for a system installation in northern latitudes (i.e., in the Northern Hemisphere). The solar cogeneration modules with two axis tracking 7T will be mounted high enough that they do not suffer from shadowing losses from shadows cast by photovoltaic panels 17 without or with some tilt.

FIG. 2B shows a plan view of a preferred embodiment of a tracking integrated photovoltaic and concentrating solar energy harvesting system supported at least in part by a hydrostatic support force 27 on a water layer 26. The illustrated embodiment shown has similarities to the preferred embodiment earlier described with reference to FIG. 2A, but now in FIG. 2B the hybrid renewable energy harvesting system 1 further includes a water energy harvesting system 28, with two types of water energy harvesting systems 28 here illustrated as (i) a wave energy harvesting subsystem 29 with a ring of many (forty-five shown, for example and without limitation) floats that can be driven up and down with wave motion to harvest energy from waves 30, and (ii) a hydrokinetic energy harvesting subsystem 31 for harvesting energy from a water current 32 (that can be one or more of a tidal current or ocean current or river current for example and without limitation) flowing in the water layer 26 beneath the floatation structure 2F (five horizontal axis water turbines 31H shown, for example and without limitation, with azimuth swivel mounting to enable water current energy harvesting regardless of the azimuthal direction of the water current 32). In the plan view of FIG. 2B, the wave energy harvesting system 29 and the hydrokinetic energy harvesting system 31 are both contained within the perimeter of the envelope of revolution 6AR of the azimuth rotating frame 6A.

More specifically, FIG. 2B illustrates a hybrid renewable energy harvesting system 1 comprising in combination: a support structure 2 configured to be located above an Earth layer 3; a heliostatic tracking system 4 with a controllable actuation system 5 for moving a frame 6 to track apparent Sun motion above said Earth layer 3, said heliostatic tracking system 4 connected to said support structure 2; a solar cogeneration system 7 connected to said frame 6, wherein said solar cogeneration system 7 comprises in combination: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; a reflective surface protection system 8 comprising a transparent surface 16 connected to said frame 6 and located at least partially above said linear concentrating reflective surface 9 when said heliostatic tracking system 4 is operating to track said apparent Sun motion; and a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIG. 2B further illustrates a hybrid renewable energy harvesting system 1 comprising in combination:

- a support structure 2 configured to be supported at least in part by a hydrostatic support force 27 arising from water displacement in a water layer 26 above an Earth layer 3;
- a heliostatic tracking system 4 with a controllable actuation system 5 for moving a frame 6 to track apparent Sun motion above said Earth layer 3;
- a solar cogeneration system 7 connected to said frame 6 and receiving support from said support structure 2, wherein said solar cogeneration system 7 includes a solar cogeneration module 7M comprising: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; and
- a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIG. 2C shows a plan view of another preferred embodiment of a tracking integrated photovoltaic and concentrating solar energy harvesting system supported at least in part by a hydrostatic support force 27 on a water layer 26. The embodiment of FIG. 2C includes a larger number of solar energy cogeneration modules with two axis tracking 7T than the embodiment of FIG. 2B, with FIG. 2C including some with tall end frame supports 6T to reduce shadowing losses from other solar energy cogeneration modules with two axis tracking 7T that are located more towards the solar azimuth angle 10A, for low solar elevation angle conditions such as near-dawn and near-dusk. A wave energy harvesting system 29 that is shown in FIG. 2C utilizes an oscillating water column wave energy harvesting system 29C with many (forty-five shown, for example and without limitation) oscillating water column modules in a ring topology that can each contribute air flow and power in both up and down strokes via appropriate valving to a flow ring from which ring air flow power can be extracted and converted into electrical power, for example with a turbine and generator. The wave energy harvesting system 29 also serves as a contributory member of a wave response reduction system 37 that serves to reduce pointing errors in the heliostatic tracking system 4 that are induced by waves 30. A hydrokinetic energy harvesting system 31 that is shown in FIG. 2C utilizes at least one (nine shown for example and without limitation) vertical axis water turbine 31V. It should be understood that the vertical axis water turbines 31V may be fixed vane turbines or controllable vane turbines in the 'cyclorotor' class of vertical axis turbines. The use of vertical axis water turbines 31V enables water current energy harvesting regardless of the azimuthal direction of the water current 32. FIG. 2C shows a floatation subsystem 44 that includes plural penetration members 45 that are water surface penetration floating posts 45P (forty-five shown, for example and without limitation) such as floating pilings, as well as an underwater buoyancy member 46 (with toroidal topology shown). The use of plural penetration members 45 that are water surface penetration floating posts 45P as well as an underwater buoyancy member 46, serve as a contributory member of a wave response reduction system 37 that serves to reduce pointing errors in the heliostatic tracking system 4 that are induced by waves 30. FIG. 2C also illustrates an equipment enclosure 58 that may comprise one or more of a building, a shed, a bay, a secure volume and an accessible enclosure; and further illustrates a power management member 57 that may comprise one or more of a power conditioning element, a voltage control element, a current control element, a safety element, a disconnect element, an AC-DC conversion element, a DC-AC conversion element, an inverter element, a power quality management element, a switch element, a power transfer element, a power point control element, a transformer element, a diode element, a relay element, a grid-connection element, a smart grid element, and an electrical element. Electrical energy 18 can be transferred out from the hybrid renewable energy harvesting system 1 through an electrical wire 18W that can be an electrical cable with appropriate (typically concentric) insulation and sheathing for safe and efficient underwater and under salt water applications.

Figure 2D:
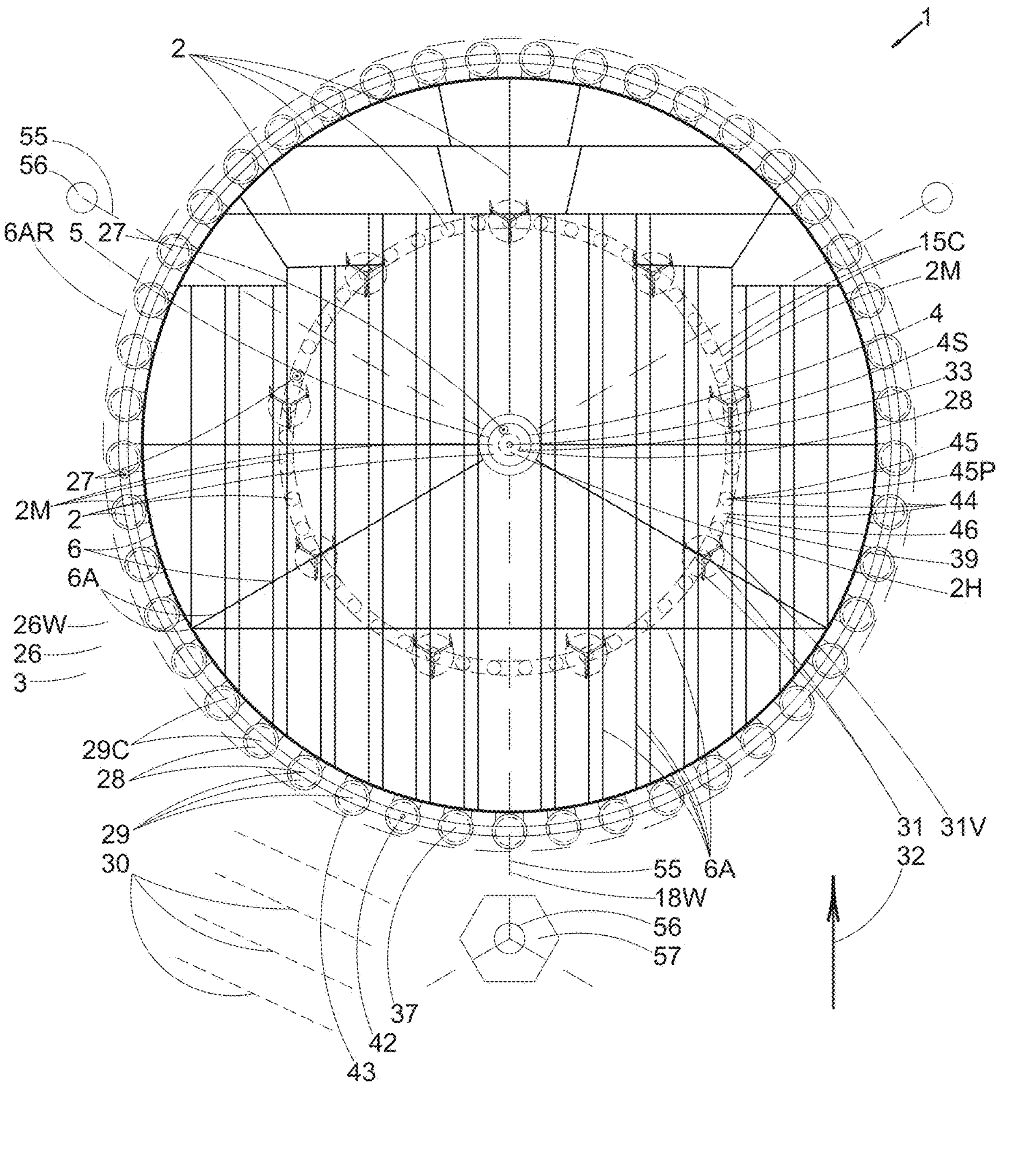
FIG. 2D shows the embodiment of FIG. 2C, also in plan view but viewed from the level of the frame and looking down.
Figure 2E:
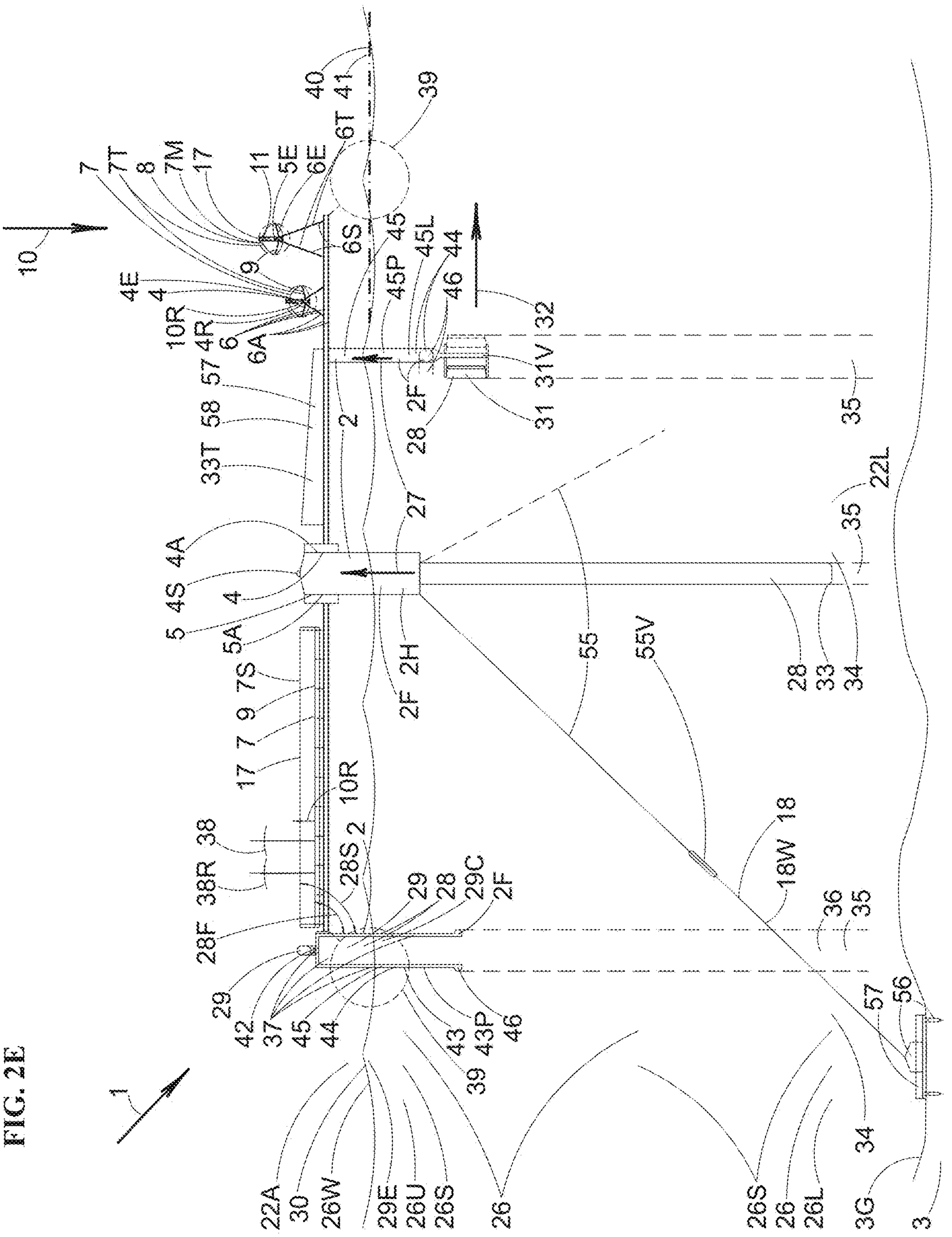
FIG. 2E shows a section view on section A-A of the preferred embodiment of FIG. 2C.

FIG. 2D shows the embodiment of FIG. 2C, also in plan view but viewed from the level of the frame and looking down, to more clearly illustrate some features of this preferred embodiment. FIG. 2E shows a section view on section A-A of the preferred embodiment of FIG. 2C.

FIG. 2D illustrates a hybrid renewable energy harvesting system 1, wherein said support structure 2 further comprises at least one floatation module 2M configured to provide a hydrostatic support force 27 contributing to support of said hybrid renewable energy harvesting system 1 at least one of on or above a water surface 26W on a water layer 26 above said Earth layer 3.

Floatation modules 2M such as the illustrated underwater toroidal floatation module 2M connected to water surface penetrating floating posts 45P can also be used to provide cooling for heat transfer fluid 15 after useful heat has been extracted, i.e. return heat transfer fluid, through surface heat exchanger subsystems, to act as a heat transfer fluid cooling subsystem 15C.

FIGS. 2C, 2D and 2E together illustrate a hybrid renewable energy harvesting system 1 comprising in combination: a support structure 2 configured to be located above an Earth layer 3; a heliostatic tracking system 4 with a controllable actuation system 5 for moving a frame 6 to track apparent Sun motion above said Earth layer 3, said heliostatic tracking system 4 connected to said support structure 2; a solar cogeneration system 7 connected to said frame 6, wherein said solar cogeneration system 7 comprises in combination: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; a reflective surface protection system 8 comprising a transparent surface 16 connected to said frame 6 and located at least partially above said linear concentrating reflective surface 9 when said heliostatic tracking system 4 is operating to track said apparent Sun motion; and a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIGS. 2C, 2D and 2E together also illustrate a hybrid renewable energy harvesting system 1 comprising in combination:

a support structure 2 configured to be supported at least in part by a hydrostatic support force 27 arising from water displacement in a water layer 26 above an Earth layer 3;

a heliostatic tracking system 4 with a controllable actuation system 5 for moving a frame 6 to track apparent Sun motion above said Earth layer 3;

a solar cogeneration system 7 connected to said frame 6 and receiving support from said support structure 2, wherein said solar cogeneration system 7 includes a solar cogeneration module 7M comprising: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; and a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIG. 2B along with FIGS. 2C, 2D and 2E together, further illustrate a hybrid renewable energy harvesting system 1, further comprising:

at least one of a wind turbine 59 and a water energy harvesting system 28, connected to at least one of said support structure 2 and said frame 6, said water energy harvesting system 28 comprising at least one of (i) a wave energy harvesting subsystem 29 configured to harvest electrical energy 18 from waves 30 in said water layer 26, and (ii) a hydrokinetic energy harvesting subsystem 31 configured to harvest electrical energy 18 from a water current 32 in said water layer 26; and (iii) a thermal energy harvesting subsystem 33 configured to harvest electrical energy 18 with a thermodynamic cycle configured to beneficially utilize low temperature water 34 from a sublayer 26S in said water layer 26 when said low temperature water 34 has a low temperature 22L that is lower than said elevated temperature 22;

and wherein said water energy harvesting system 28 is configured with first spacing 28F from said solar cogeneration system 7 and second spacing 28S from said photovoltaic panel 17 such that a shadow volume 35 cast by sunlight 10 falling on said water energy harvesting system 28 directly from the Sun is characterized by a downwardly progressing volume 36 that does not block sunlight 10 from being received directly from the Sun by either said linear concentrating reflective surface 9 or said photovoltaic panel 17.

The use of low temperature water 34 in a thermodynamic cycle with low efficiency has been disclosed in the prior art of Ocean Thermal Energy Conversion systems or OTEC systems; however in the present invention the use of the low temperature water 34 as the low temperature part and the solar-heated heat transfer fluid 15 for the high temperature part of a thermodynamic cycle enable substantially improved cycle efficiency for the thermal energy harvesting subsystem 33, relative to prior art OTEC systems. The thermodynamic cycle may utilize an Organic Rankine cycle or other thermodynamic cycle (and may optionally be located in an equipment enclosure 58), within the spirit and scope of the invention.

It should be understood that the shadow volume 35 can be for a particular time and location, or a grouping of times and locations, or an envelope volume that covers different Sun angles for all days of all seasons at any particular installation location in the World.

FIGS. 2E, 2C and 2D together also illustrate a hybrid renewable energy harvesting system 1, further comprising:

a wave response reduction system 37 configured to reduce a root-mean-square wave-induced pointing error 38 affecting said reflected and concentrated sunlight 10R from the Sun when said heliostatic tracking system 4 is tracking said apparent Sun motion, relative to a reference root-mean-square wave-induced pointing error 38R that would occur if the support structure 2 comprised a toroidal float 39 circumscribing said solar cogeneration system 7 in plan view, wherein the equatorial plane 40 of said toroidal float 39 approximately coincides with the mean surface plane 41 of said water layer 26;

and wherein said wave response reduction system 37 comprises at least one of (i) an absorber moving member 42 configured to absorb at least some wave energy 29E from a wave 30 in an upper sublayer 26U of said water layer 26 and (ii) a wave-reflecting member 43 configured to reflect a wave 30 carrying at least some wave energy 29E and (iii) and a suspension subsystem 37S (iv) a floatation subsystem 44 portion of said support structure 2 wherein said floatation subsystem 44 comprises plural penetration members 45 projecting relative to said frame 6 downwardly into the upper sublayer 26U of said water layer 26, with lower portions 45L of at least some of said plural penetration members 45 connecting to at least one underwater buoyancy member 46.

Note that for the illustration in FIG. 2E, the root-mean-square wave-induced pointing error 38 is illustrated as 0.30 degrees for example and without limitation; and the reference root-mean-square wave-induced pointing error 38R is illustrated as 0.77 degrees for example and without limitation, for the case of the floatation system replaced by a hypothesized alternate floatation system comprising a toroidal float 39 as illustrated in dashed cross-sectional circles.

FIGS. 2E, 2C and 2D together also illustrate a hybrid renewable energy harvesting system 1 wherein said support structure 2 includes floatation structure 2F configured to be supported by said hydrostatic support force 27 from water displacement in said water layer 26, and wherein said heliostatic tracking system 4 comprises a heliostatic azimuth tracking subsystem 4A configured to provide azimuth heliostatic tracking with said controllable actuation system 5 comprising an azimuth actuation subsystem 5A configured to rotate said floatation structure 2F relative to an Earth-fixed base 56, and wherein said frame 6 receives support from said floatation structure 2F.

FIG. 2E shows a suspension member 6S incorporated in the support legs for a solar cogeneration module with two axis tracking 7T. The suspension member 6S can be a passive or active suspension member, and incorporate one or more elements selected from a compression suspension member such as a spring or spring-damper or shock absorber, a tension suspension member such as a bungee cord or stretchable member, and a swinging with gravity suspension member for reducing pointing errors. Use of a hexapod suspension as known from the prior art of flight simulators, is also possible within the scope of the invention. More particularly, FIGS. 2E, 2C and 2D together illustrate a hybrid renewable energy harvesting system 1, wherein said frame 6 further comprises a suspension member 6S (such as actively controlled leg lengths, without limitation) configured to be controlled at least in part by said heliostatic tracking system 4 to reduce heliostatic tracking error 4R induced by motion of water in said water layer 26.

Figure 2F:
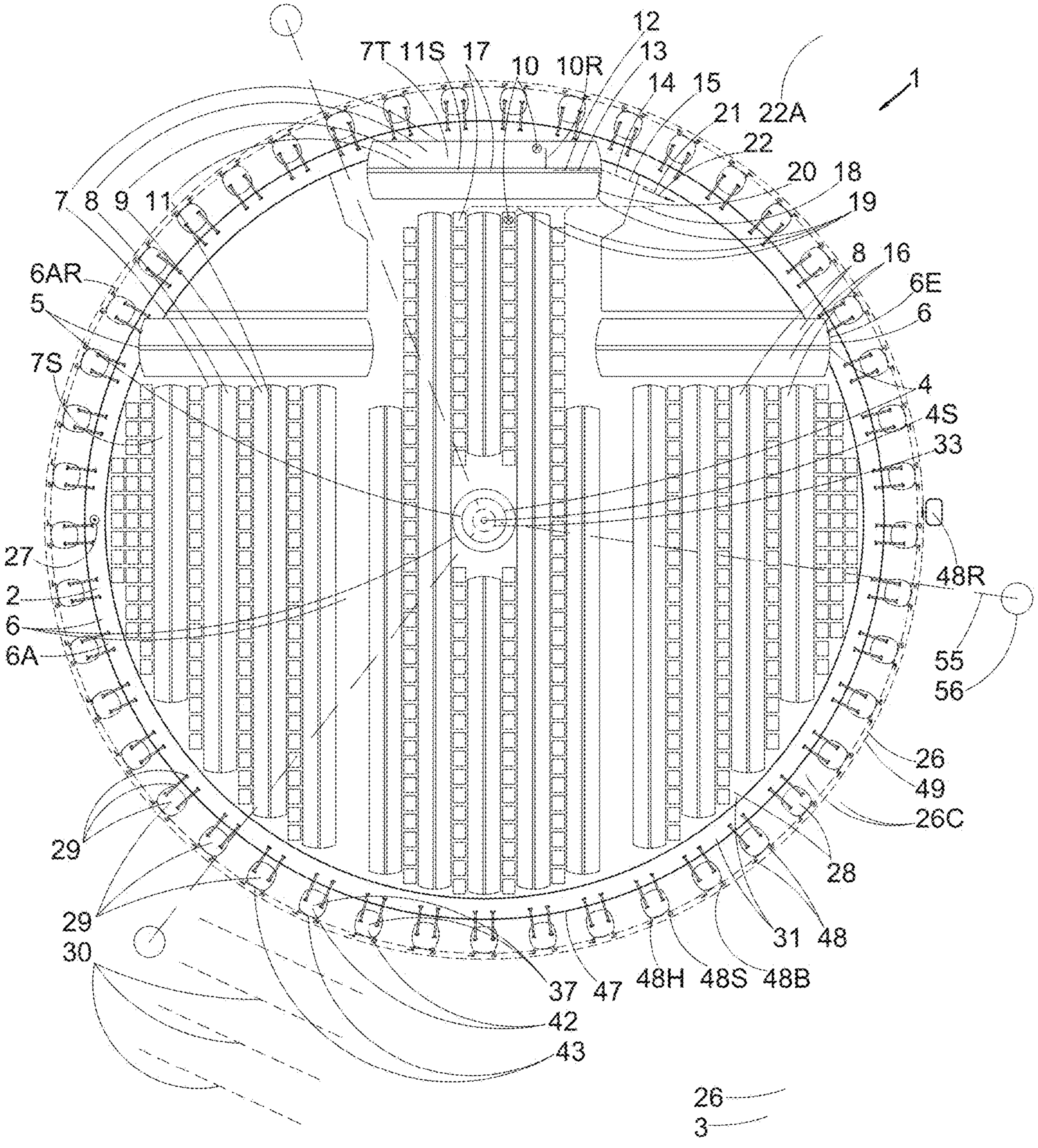
FIG. 2F shows a plan view of a preferred embodiment of tracking integrated photovoltaic and concentrating solar energy harvesting system supported at least in part by a hydrostatic support force on a water layer, with anti-ice features to enable continued operation when there is at least some surface ice on the water layer.

FIG. 2F shows a plan view of a preferred embodiment of tracking integrated photovoltaic and concentrating solar energy harvesting system supported at least in part by a hydrostatic support force 27 on a water layer 26, with anti-ice features to enable continued operation when there is at least some surface ice on the water layer 26. An anti-ice system 48 can optionally leverage features from prior art anti-ice systems in other applications for preventing ice formation, inhibiting ice formation, melting ice, effacing ice, breaking ice, cutting ice or shattering ice.

More specifically, FIG. 2F shows a hybrid renewable energy harvesting system 1, wherein said frame 6 includes a buoyant perimeter structure 47, and further comprising a circumscribing anti-ice system 48 that is connected to said buoyant perimeter structure 47, which circumscribing anti-ice system 48 at least one of: (a) prevents surface ice formation on top of said water layer 26 in a ring region 49 around said buoyant perimeter structure 47 and (b) effaces surface ice 26C on top of said water layer 26 in said ring region 49 around said buoyant perimeter structure 47.

In variant applications and embodiments, the circumscribing anti-ice system 48 can optionally include at least one of the several subsystems illustrated in FIG. 2F: namely a bubbler subsystem 48B, a heater subsystem 48H, a swirler subsystem 48S and a robotic mobile ice saw subsystem 48R. A bubbler subsystem 48B to make and keep the ring region 49 ice-free, can utilize features and technologies from prior art dock bubbler systems such as a motor driven pump/propeller/waterjet that moves warmer water from a lower layer of water below an ice layer, moving warmer water and bubbles up to the surface with upward and horizontal velocity components, along with optional thermostat and frame-support and adjustability and oscillator features. A swirler subsystem 48S can use some of the same features and technologies as a bubbler subsystem 48B, with the added feature of adding a circumferential water flow around said ring region 49 to help make and keep this region's surface ice-free. A heater subsystem 48H can use heat from one or more of a heat pump, electrical resistance heating, combustion-source heating, phase-change heating and other heating, to make and keep the ring region 49 ice-free. A robotic mobile ice saw subsystem 48R can utilize features and technologies from prior art of: ice saws as well as surface vehicles (e.g., a snowmobile or Zamboni or other water/frozen layer supported vehicle) and robotic control & operation and monitoring & safety subsystems.

Figure 2G:
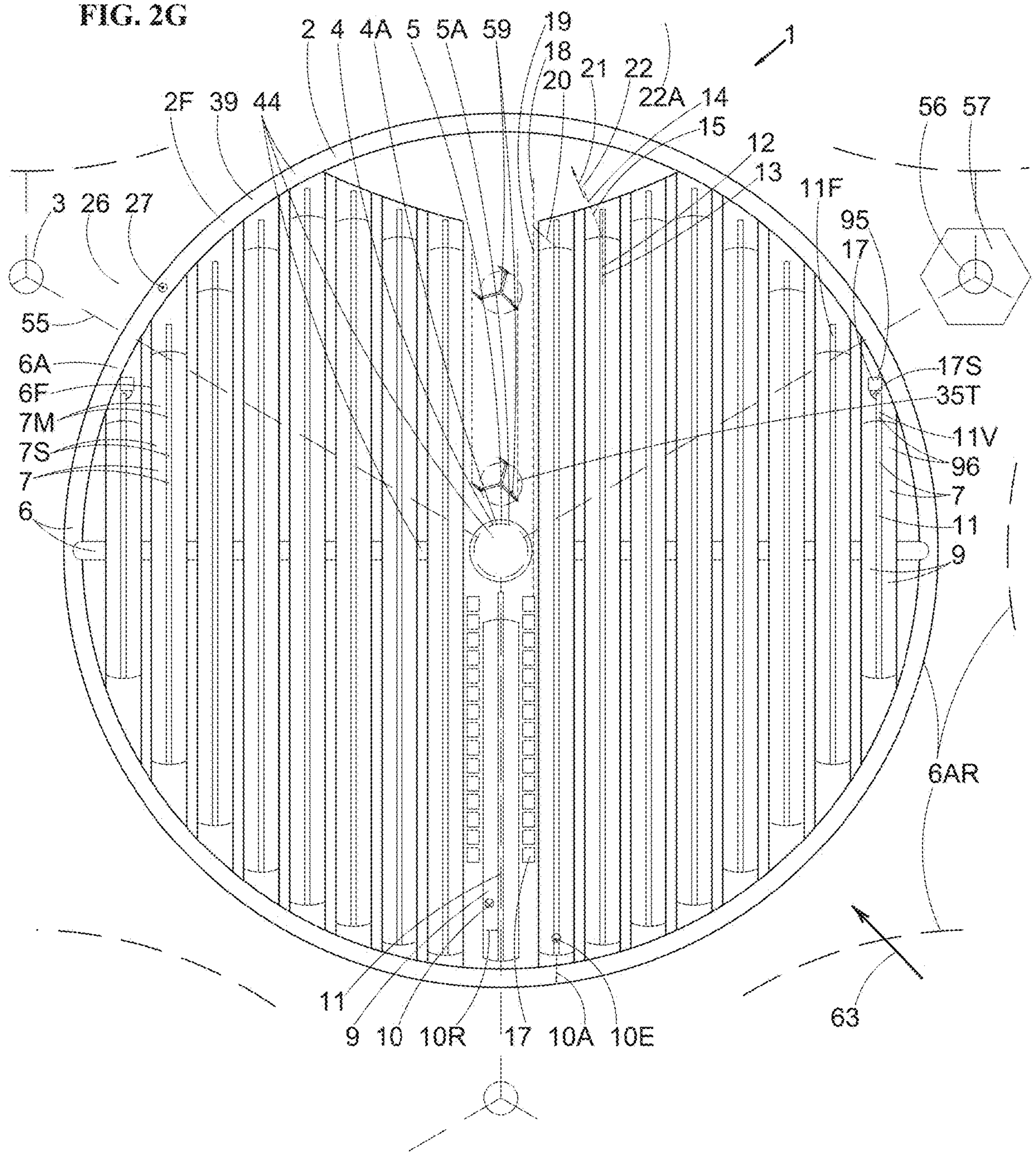
FIG. 2G shows a plan view of a preferred embodiment of an offshore renewable energy harvesting system capable of harvesting both solar energy and wind energy.

FIG. 2G shows a plan view of a preferred embodiment of an offshore renewable energy harvesting system capable of harvesting both solar energy and wind energy. This embodiment includes a synergistic combination of (i) a solar cogeneration system 7 with solar cogeneration modules with single axis tracking 7S, (ii) photovoltaic panels 17, and (iii) a wind energy harvesting system here comprising at least one wind turbine 59 (with more than one vertical axis wind turbine shown, such as cycloturbines with blade angle control for optimized power harvest with variable winds from variable directions, for example and without limitation) configured to harvest energy from wind 63. The hybrid renewable energy harvesting system 1 is shown held within a geographic envelope that encompasses an envelope of revolution 6AR of the azimuth rotating frame 6A, with envelopes of revolution 6AR of five of the six adjacent energy harvesting systems in a hexagonal array also shown in dashed lines, and representative tether members 55 to Earth fixed bases 56 shown that can be shared as anchor points for plural energy harvesting systems, as shown. Power management members 57 can be supported and connected with selected Earth fixed bases 56, as shown.

More specifically, FIG. 2G shows a hybrid renewable energy harvesting system 1, further comprising:

at least one of a wind turbine 59 (shown) and a water energy harvesting system 28 (not shown), connected to at least one of said support structure 2 and said frame 6, said water energy harvesting system 28 (not shown) comprising at least one of (i) a wave energy harvesting subsystem 29 configured to harvest electrical energy 18 from waves 30 in said water layer 26, and (ii) a hydrokinetic energy harvesting subsystem 31 configured to harvest electrical energy 18 from a water current 32 in said water layer 26; and (iii) a thermal energy harvesting subsystem 33 configured to harvest electrical energy 18 with a thermodynamic cycle configured to beneficially utilize low temperature water 34 from a sublayer 26S in said water layer 26 when said low temperature water 34 has a low temperature 22L that is lower than said elevated temperature 22;

and wherein said water energy harvesting system 28 (not shown) is configured with first spacing 28F from said solar cogeneration system 7 and second spacing 28S from said photovoltaic panel 17 such that a shadow volume 35 cast by sunlight 10 falling on said water energy harvesting system 28 directly from the Sun is characterized by a downwardly progressing volume 36 that does not block sunlight 10 from being received directly from the Sun by either said linear concentrating reflective surface 9 or said photovoltaic panel 17.

FIG. 2G also shows a hybrid renewable energy harvesting system 1, wherein said support structure 2 includes floatation structure 2F configured to be supported by said hydrostatic support force 27 from water displacement in said water layer 26, and wherein said heliostatic tracking system 4 comprises a heliostatic azimuth tracking subsystem 4A configured to provide azimuth heliostatic tracking with said controllable actuation system 5 comprising an azimuth actuation subsystem 5A configured to rotate said floatation structure 2F relative to an Earth-fixed base 56, and wherein said frame 6 receives support from said floatation structure 2F.

FIG. 2G also shows a hybrid renewable energy harvesting system 1, wherein said solar cogeneration module 7M is a solar cogeneration module with single axis tracking 7S, and wherein linear axes of said linear concentrating reflective surface 9 and of said linear concentrating photovoltaic receiver 11 are configured to be substantially aligned parallel to solar azimuth angle 10A by said heliostatic azimuth tracking subsystem 4A, and wherein said linear photovoltaic receiver 11 includes at least one of a fixed extension 11F and a variable extension 11V in an opposite to sunward azimuthal direction to enable reduced-loss energy harvest from said reflected and concentrated sunlight 10R when solar elevation angle 10E is less than 90 degrees.

FIG. 2G also shows a hybrid renewable energy harvesting system 1, wherein the wind turbine(s) 59 is/are configured with spacing from said solar cogeneration system(s) 7 and said photovoltaic panel(s) 17 such that a wind turbine shadow volume 35T cast by sunlight 10 falling on said wind turbine(s) directly from the Sun is characterized by a downwardly progressing volume that does not block sunlight 10 from being received directly from the Sun by either said linear concentrating reflective surface(s) 9 of the solar cogeneration system(s) or said photovoltaic panel(s) 17.

FIG. 2G also shows a hybrid renewable energy harvesting system 1, wherein a photovoltaic panel 17 with a first spatial location and orientation 95 and a solar cogeneration system 7 with a second spatial location and orientation 96 are separated by spacing 17S. Note that the illustrated solar cogeneration system 7 also includes a linear concentrating reflective surface 9 and a linear concentrating photovoltaic receiver 11 with a variable extension 11V. The spacing 17S can be optionally modified as beneficial by moving the variable extension 11V, though in other preferred embodiments other types of rotatable, translatable, movable or adjustable mountings for a photovoltaic panel 17 and/or components of a solar cogeneration system 7 can be used to modify spacing 17S as desired. A beneficial modification of spacing 17S may be for a variety of purposes including without limitation (i) increasing total harvest of electrical energy 18 and usable heat energy 14 for some particular condition and time, and (ii) reducing risk for some particular risk condition and time (this feature will be further described below with reference to FIG. 4D). Increased energy harvest may occur with reduced shadowing losses as one example, and reduced risk may occur with avoidance of mechanical interference and avoidance of overheating conditions as a couple of examples, without limitation.

Figure 3A:
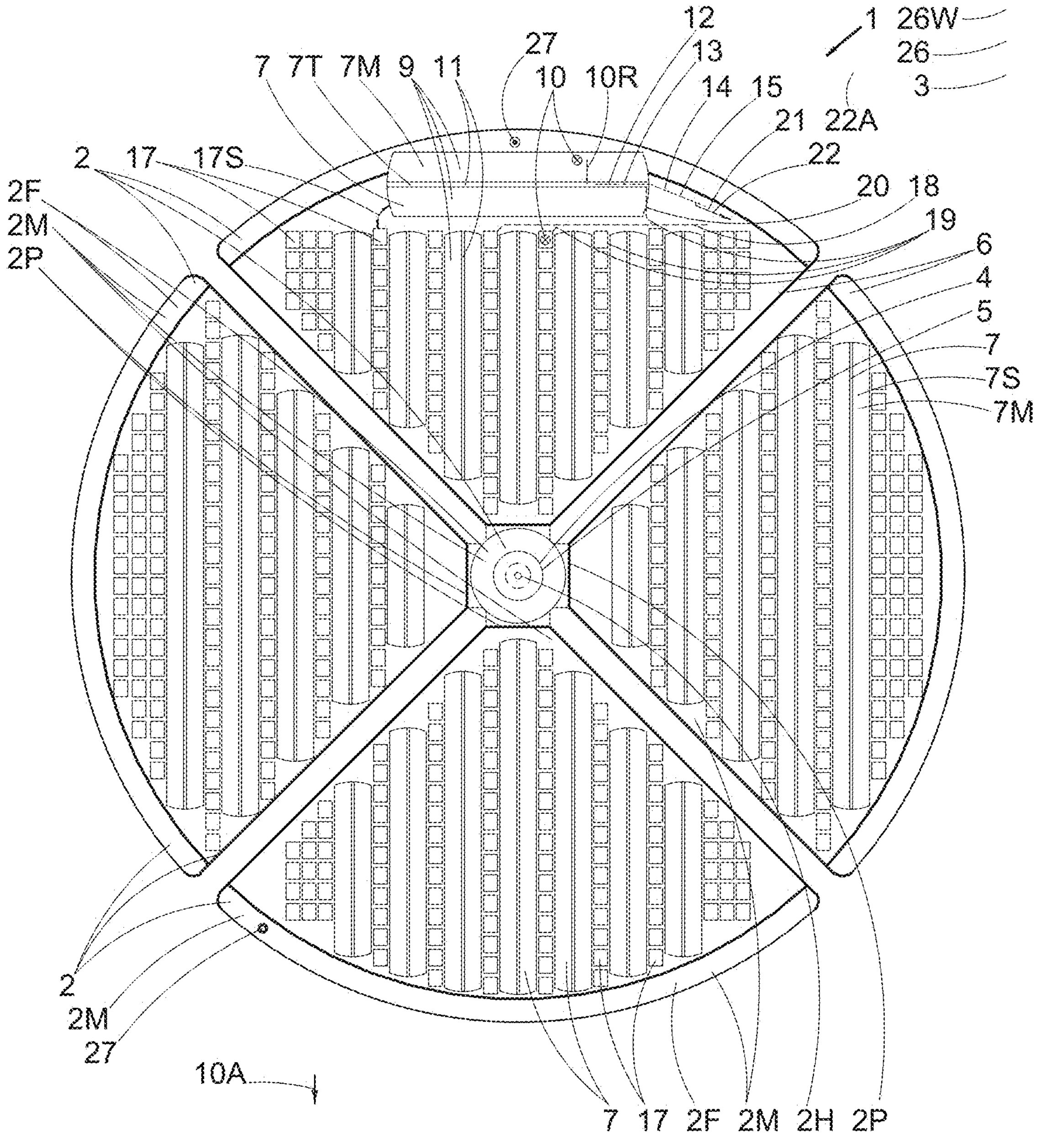
FIGS. 3A through 3C show plan views of preferred embodiments of tracking integrated photovoltaic and concentrating solar energy harvesting systems with plural connected floatation modules.
Figure 3B:
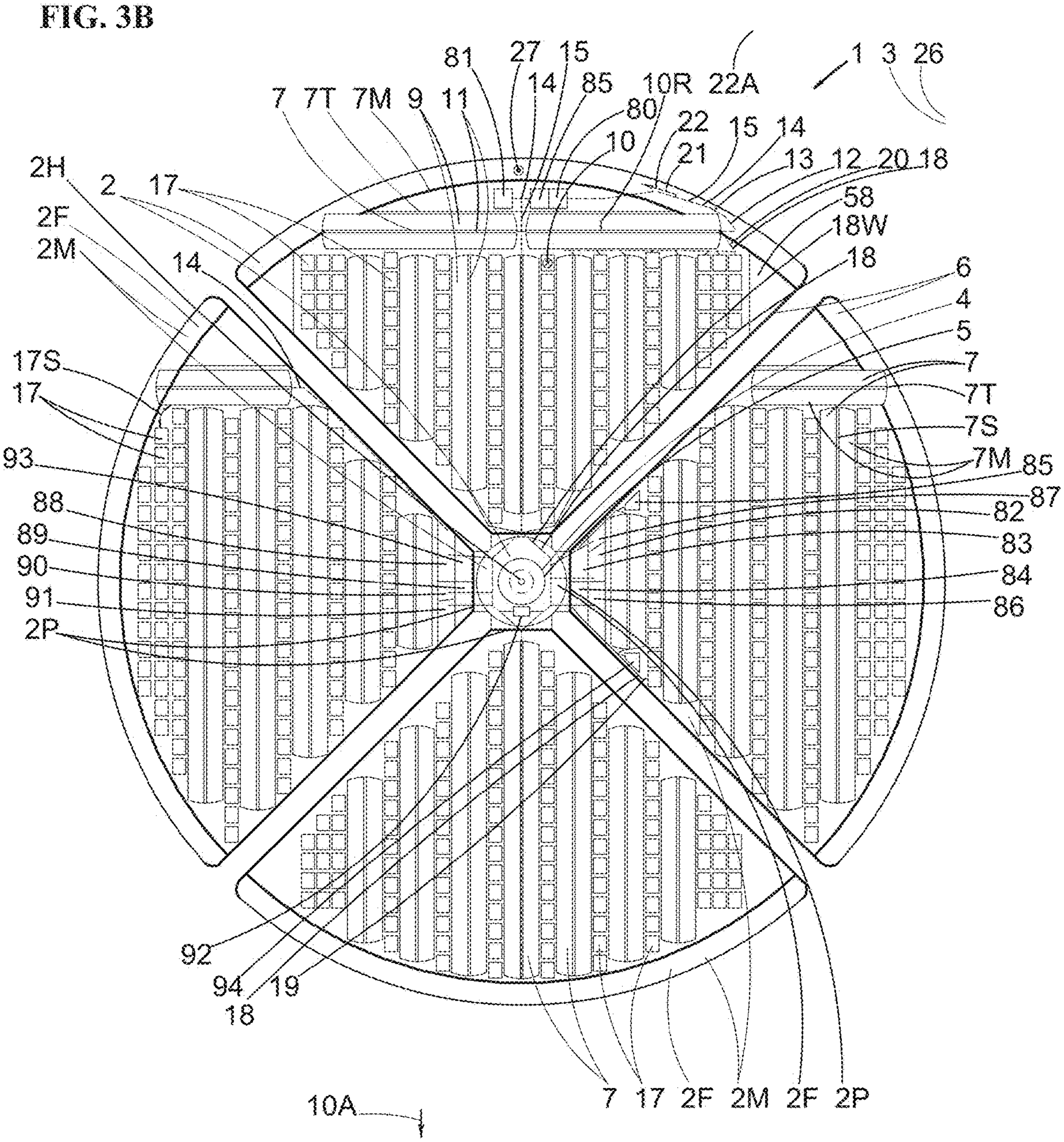
Figure 3C:
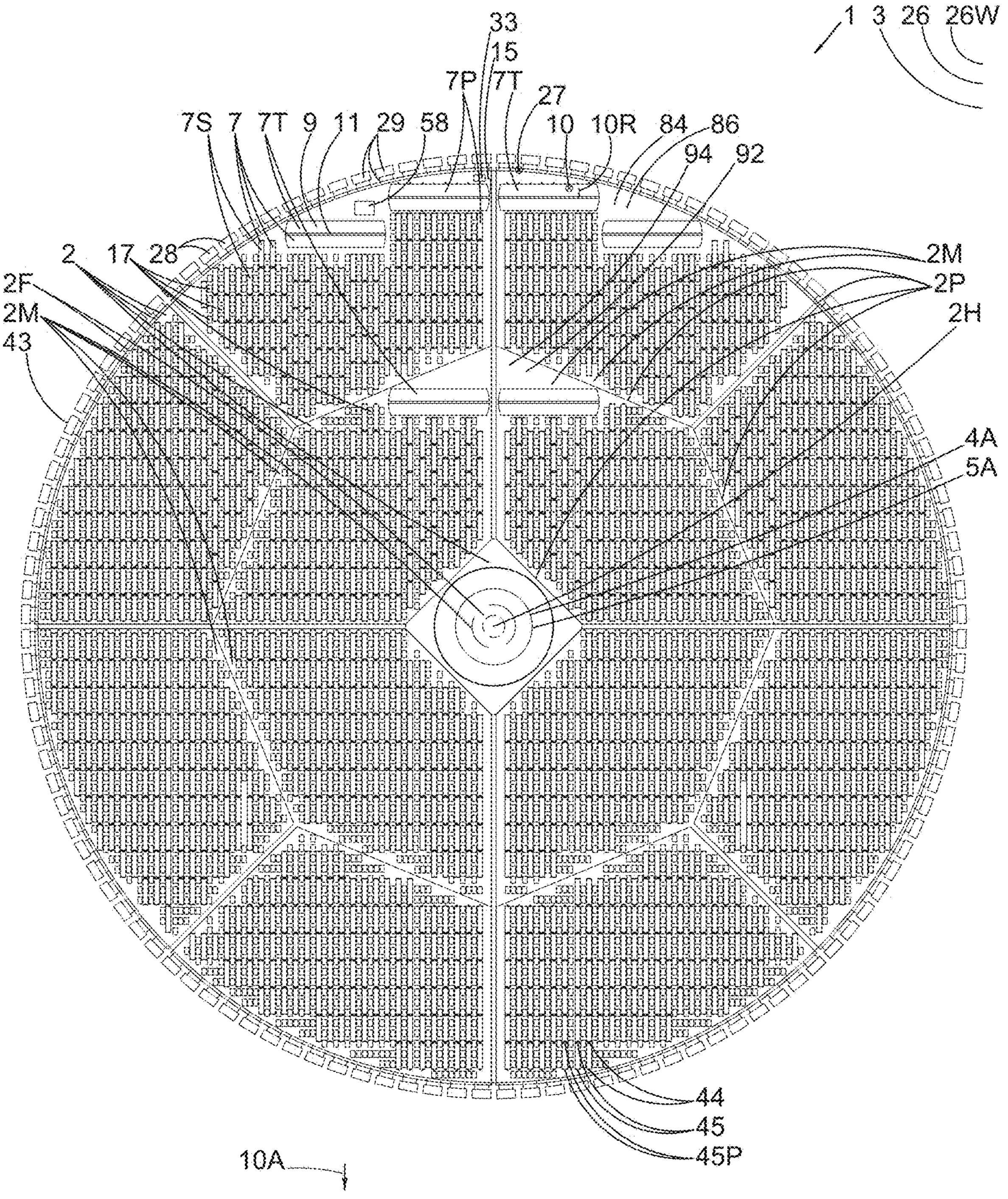

FIGS. 3A through 3C show plan views of preferred embodiments of tracking integrated photovoltaic and concentrating solar energy harvesting systems with plural connected floatation modules.

FIG. 3A illustrates a hybrid renewable energy harvesting system 1 with support structure 2 configured into plural (four shown, without limitation) floatation modules 2M arranged in petal fashion and connected by motion permitting connection members 2P such as hinges, around a central floatation module 2M connected to an anchored hub 2H. Note that the motion permitting connection members 2P may include one or more selected from: joint members, hinges, bungee members, cord members, mesh members, universal joint members, sliding members, bearings, and lubricated members, for example and without limitation. The motion permitting connection members 2P may also be fitted with associated motion permitting connections such as flexible connections for electrical signal wire, optical signal line, electrical power wire or cable, EME line, grounding line, heat transfer fluid pipe/hose, hydraulic line, and pneumatic line.

More particularly, FIG. 3A shows a hybrid renewable energy harvesting system 1, wherein said support structure 2 includes floatation structure 2F comprising plural floatation modules 2M and at least one motion permitting connection member 2P connecting two adjacent floatation modules 2M.

The illustrated hybrid renewable energy harvesting system 1 in FIG. 3A includes plural photovoltaic panels 17 and a solar cogeneration system 7 with plural solar cogeneration modules 7M. The solar cogeneration modules include both solar cogeneration modules with single axis tracking 7S and a solar cogeneration module with two axis tracking 7T that is shown on the floatation module 2M opposite to the solar azimuth angle 10A so that it does not cast any shadow on any photovoltaic panels 17 for low Sun angle scenarios. The illustrated configuration with plural floatation modules 2M and motion permitting connection members 2P enables reduction in wave-induced loads and reduction in system weight and cost, along with better rogue wave and storm survivability, while still maintaining precise azimuth tracking of all solar energy collectors including the photovoltaic panels 17 and solar cogeneration system 7.

FIG. 3A also shows a hybrid renewable energy harvesting system 1 comprising in combination:

- a support structure 2 configured to be supported at least in part by a hydrostatic support force 27 arising from water displacement in a water layer 26 above an Earth layer 3;
- a heliostatic tracking system 4 with a controllable actuation system 5 for moving a frame 6 to track apparent Sun motion above said Earth layer 3;
- a solar cogeneration system 7 connected to said frame 6 and receiving support from said support structure 2, wherein said solar cogeneration system 7 includes a solar cogeneration module 7M comprising: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; and
- a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIG. 3A also shows a hybrid renewable energy harvesting system 1, wherein said support structure 2 further comprises at least one floatation module 2M configured to provide a hydrostatic support force 27 contributing to support of said hybrid renewable energy harvesting system 1 at least one of on or above a water surface 26W on a water layer 26 above said Earth layer 3.

FIG. 3B shows a preferred embodiment similar to that shown in FIG. 3A, in having a hybrid renewable energy harvesting system 1 with support structure 2 configured into plural (four shown, without limitation) floatation modules 2M arranged in petal fashion and connected by motion permitting connection members 2P such as hinges, around a central floatation module 2M connected to an anchored hub 2H. The illustrated hybrid renewable energy harvesting system 1 in FIG. 3B includes plural photovoltaic panels 17 and a solar cogeneration system 7 with plural solar cogeneration modules 7M. The solar cogeneration modules include both solar cogeneration modules with single axis tracking 7S and solar cogeneration modules with two axis tracking 7T.

FIG. 3B again shows a hybrid renewable energy harvesting system 1 comprising in combination:

- a support structure 2 configured to be supported at least in part by a hydrostatic support force 27 arising from water displacement in a water layer 26 above an Earth layer 3;
- a heliostatic tracking system 4 with a controllable actuation system 5 for moving a frame 6 to track apparent Sun motion above said Earth layer 3;
- a solar cogeneration system 7 connected to said frame 6 and receiving support from said support structure 2, wherein said solar cogeneration system 7 includes a solar cogeneration module 7M comprising: a linear concentrating reflective surface 9 configured to face toward the Sun and receive sunlight 10 directly from the Sun when said heliostatic tracking system 4 is operating to track said apparent Sun motion, a linear concentrating photovoltaic receiver 11 configured to at least partially face said linear concentrating reflective surface 9 and therefrom receive reflected and concentrated sunlight 10R from the Sun, and a heat transfer subsystem 12 configured to receive heat energy 13 from said linear concentrating photovoltaic receiver 11 and to transfer at least a portion of said heat energy 13 to usable heat energy 14 in a flowing heat transfer fluid 15; and
- a photovoltaic panel 17 connected to said frame 6 and configured to receive sunlight 10 directly from the Sun when said heliostatic tracking system 4 is operating to track said apparent Sun motion, said photovoltaic panel 17 configured with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable said solar cogeneration system 7 to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A.

FIG. 3B also shows a hybrid renewable energy harvesting system 1, wherein said flowing heat transfer fluid 15 transports said usable heat energy 14 to at least one of: (i) a desalination subsystem 80 and (ii) a hydrogen production subsystem 81.

FIG. 3B also shows a hybrid renewable energy harvesting system 1, wherein said flowing heat transfer fluid 15 transports said usable heat energy 14 to at least one of: (i) a solar hot water subsystem 82 and (ii) a building heat subsystem 83 and (iii) a heat storage subsystem 84 and (iv) a district heating subsystem 86 and (v) a pool heating subsystem 87 and (vi) a cooling subsystem 88 utilizing said usable heat energy 14 in conjunction with at least one of an adsorption chiller 89 and an absorption chiller 90 and (vii) an integrated temperature management system 92 that further comprises at least two of a hot storage module 85 and a cold storage module 91 and a heat pump module 93 and (viii) a supplemental electricity generation subsystem 94.

Note that the embodiment shown in FIG. 3B can optionally include one or more of: (i) heat storage that is phase change heat storage, (ii) a combination of heat storage and cold storage, (iii) phase change storage for night heating, and (iv) the combined use of a hot tank plus a cold tank to enable 24/7 temperature control for a building and/or a district. The supplemental electricity generation subsystem 94 can optionally incorporate a thermodynamic cycle plus generator subsystem and/or a thermoelectric subsystem.

FIG. 3C shows a plan view of a preferred embodiment of a tracking integrated photovoltaic and concentrating solar energy harvesting system with plural connected floatation modules. This preferred embodiment is substantially larger in diameter and plan view area than that described earlier with reference to FIGS. 3A and 3B. A hybrid renewable energy harvesting system 1 is shown, with support structure 2 configured into plural floatation modules 2M arranged with plural petal members (12 shown, without limitation) that are connected by motion permitting connection members 2P such as hinges, around a central floatation module 2M connected to an anchored hub 2H. The use of plural petal members connected by plural motion permitting connection members 2P enables reduced wave induced loads and correspondingly reduced overall system weight and cost, while still preserving shared azimuth heliostatic tracking (by the motion permitting connection members 2P being substantially locked in the azimuth degree of freedom). The illustrated hybrid renewable energy harvesting system 1 in FIG. 3C includes plural photovoltaic panels 17 and a solar cogeneration system 7 with plural solar cogeneration modules 7M. The solar cogeneration modules include both solar cogeneration modules with single axis tracking 7S and solar cogeneration modules with two axis tracking 7T. The larger size of this preferred embodiment can also facilitate the option of including series connected solar cogeneration modules with different photovoltaic subsystems tailored to increasing temperature of operation, followed by purely solar thermal modules 7P for still higher temperature heating of heat transfer fluid 15, such as to enable higher thermodynamic efficiency of a thermal energy harvesting system 33. The CPV members such as solar cells of the linear concentrating solar receiver 11 can use any of a wide variety of solar cells including one or more selected from: monocrystalline silicon solar cells, polycrystalline silicon solar cells, amorphous silicon solar cells, organic photovoltaics, perovskites, cadmium telluride solar cells, copper indium gallium selenide solar cells, quantum dots, heterojunction solar cells, hybrid solar cells, biohybrid solar cells, passivated emitter and rear contact solar cells, thin film solar and other solar cells. Plural solar cell types can optionally be used, for example a lower cost lower temperature capable solar cell for an installation location with a lower design maximum temperature, and a less inexpensive but higher temperature capable solar cell for an installation location with a higher design maximum temperature just prior to heat transfer fluid 15 moving on to purely solar thermal modules 7P.

FIG. 3C also shows a floatation subsystem 44 that comprises plural penetration members 45 including water surface penetrating floating posts 45P such as floating pilings.

Figure 3D:
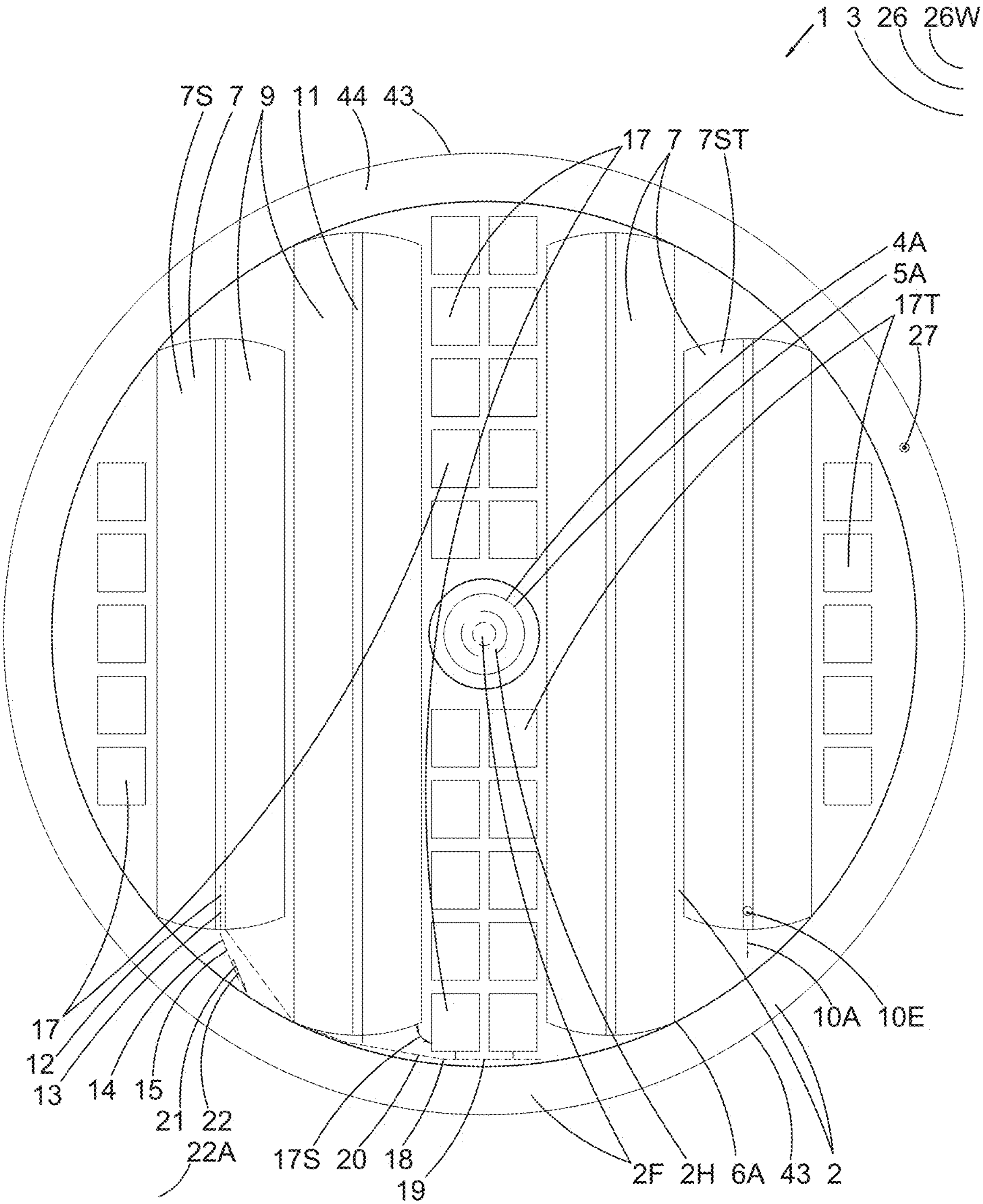
FIG. 3D shows a plan view of a smaller-scale preferred embodiment of a tracking integrated photovoltaic and concentrating solar energy harvesting system supported at least in part by a hydrostatic support force on a water layer.

FIG. 3D shows a plan view of a smaller-scale preferred embodiment of a tracking integrated photovoltaic and concentrating solar energy harvesting system supported at least in part by a hydrostatic support force 27 on a water layer 26. This preferred embodiment is substantially smaller in diameter and plan view area than that described earlier with reference to FIGS. 3A and 3B. A hybrid renewable energy harvesting system 1 is shown, with support structure 2 including floatation structure 2F, with the support structure 2 connected to an anchored hub 2H. Azimuth tracking of an azimuth rotating frame 6A is provided by a heliostatic azimuth tracking subsystem 4A with an azimuth actuation subsystem 5A. The illustrated hybrid renewable energy harvesting system 1 in FIG. 3D includes plural photovoltaic panels 17 and a solar cogeneration system 7 with both at least one solar cogeneration module with single axis tracking 7S and at least one tilted solar cogeneration module with single axis tracking 7ST, preferably with tilt towards the solar azimuth angle 10A. At least one of the photovoltaic panels 17 will also preferably be a tilted solar panel 17T, also preferably with tilt towards the solar azimuth angle 10A. Other features of the preferred embodiment of FIG. 3D can correspond, without limitation, to features earlier described and illustrated with reference to FIGS. 3A through 3C.

FIGS. 4A through 4D show diagrams of preferred embodiments of hybrid methods of harvesting renewable energy that provide method steps pertaining to tracking integrated photovoltaic and concentrating solar energy harvesting systems. The methods are operative methods applicable to operations of hybrid renewable energy harvesting systems 1 that have already been described with reference to preceding Figures.

Figure 4A:
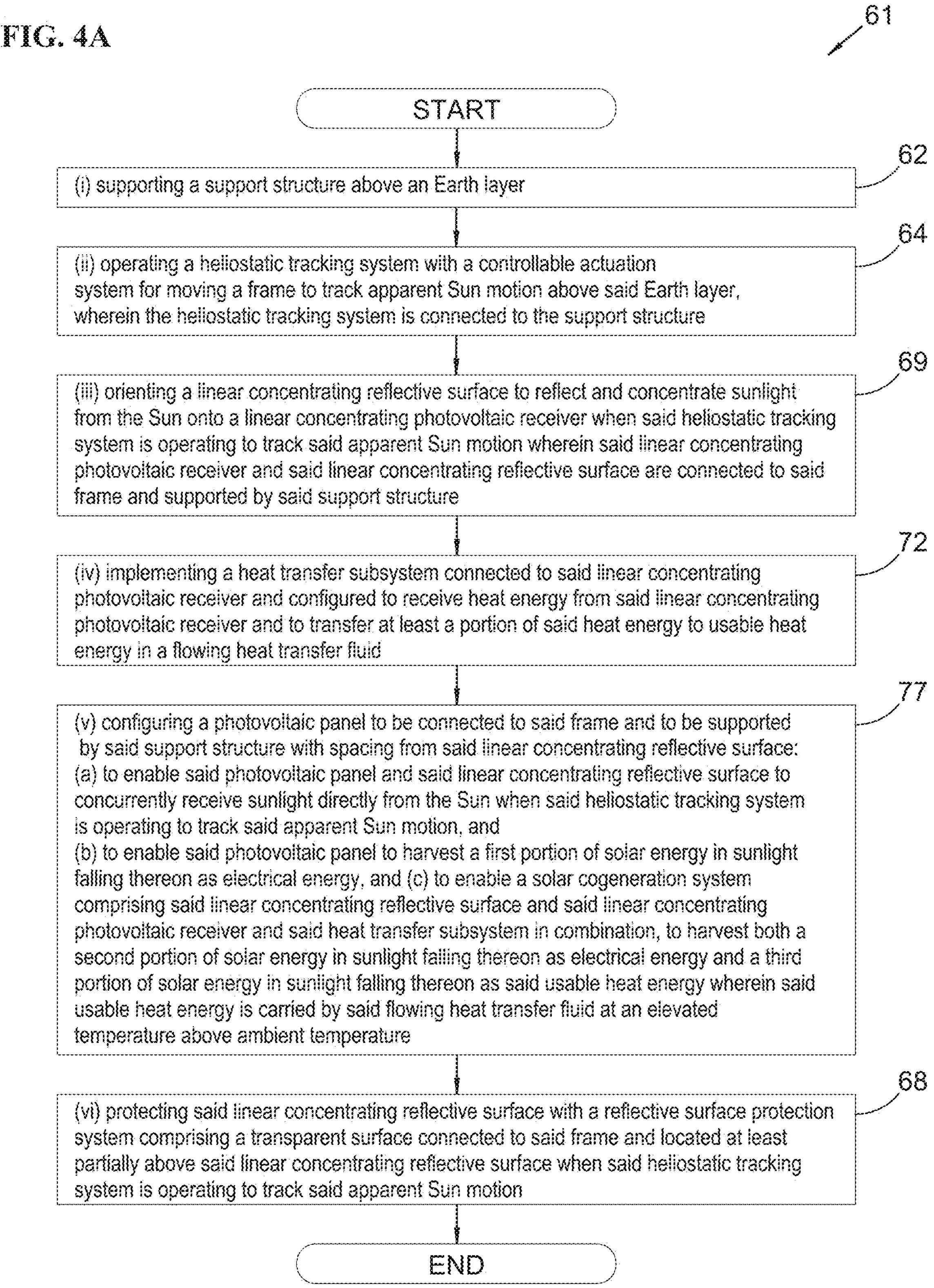
FIGS. 4A through 4D show diagrams of preferred embodiments of hybrid methods of harvesting renewable energy that provide method steps pertaining to tracking integrated photovoltaic and concentrating solar energy harvesting systems.

FIG. 4A illustrates method steps for implementation and/or operation of preferred embodiments of tracking integrated photovoltaic and concentrating solar energy harvesting systems such as those described in detail above with reference to FIGS. 1A-1G, 2A-2G, and 3A-3D.

More specifically, FIG. 4A shows a hybrid method of harvesting renewable energy 61 comprising the steps of:

(i) supporting 62 a support structure 2 above an Earth layer 3;

(ii) operating 64 a heliostatic tracking system 4 with a controllable actuation system 5 for moving a frame 6 to track apparent Sun motion above said Earth layer 3, wherein the heliostatic tracking system 4 is connected to the support structure 2;

(iii) orienting 69 a linear concentrating reflective surface 9 to reflect and concentrate sunlight from the Sun onto a linear concentrating photovoltaic receiver 11 when said heliostatic tracking system 4 is operating to track said apparent Sun motion, wherein said linear concentrating photovoltaic receiver 11 and said linear concentrating reflective surface 9 are connected to said frame 6 and supported by said support structure 2;

(iv) implementing 72 a heat transfer subsystem 12 connected to said linear concentrating photovoltaic receiver 11 and configured to receive heat energy 13 from said linear concentrating photovoltaic receiver 11 and to transfer at least a portion of said heat energy 13 to usable heat energy 14 in a flowing heat transfer fluid 15;

(v) configuring 77 a photovoltaic panel 17 to be connected to said frame 6 and to be supported by said support structure 2 with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable a solar cogeneration system 7 comprising said linear concentrating reflective surface 9 and said linear concentrating photovoltaic receiver 11 and said heat transfer subsystem 12 in combination, to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A; and (vi) protecting 68 said linear concentrating reflective surface 9 with a reflective surface protection system 8 comprising a transparent surface 16 connected to said frame 6 and located at least partially above said linear concentrating reflective surface 9 when said heliostatic tracking system 4 is operating to track said apparent Sun motion.

It should be understood that the heliostatic tracking system 4 and controllable actuation system 5 can comprise one or both of single axis and two axis heliostatic tracking subsystems and one or both of single axis and two axis controllable actuation subsystems, as described and illustrated earlier in the specification. Also as described and illustrated earlier in the specification, installations with tilt towards the solar azimuth angle can be used for either or both of a photovoltaic panel 17 (through use of a tilted photovoltaic panel 17T) and a solar cogeneration module 7M (through use of a tilted solar cogeneration module with single axis tracking 7ST). The tilted installations can enable better solar energy capture for single axis (azimuth) tracking subsystems in conditions of low Sun angle such as earlier solar morning or later solar evening times of operation of the hybrid renewable energy harvesting system 1.

Figure 4B:
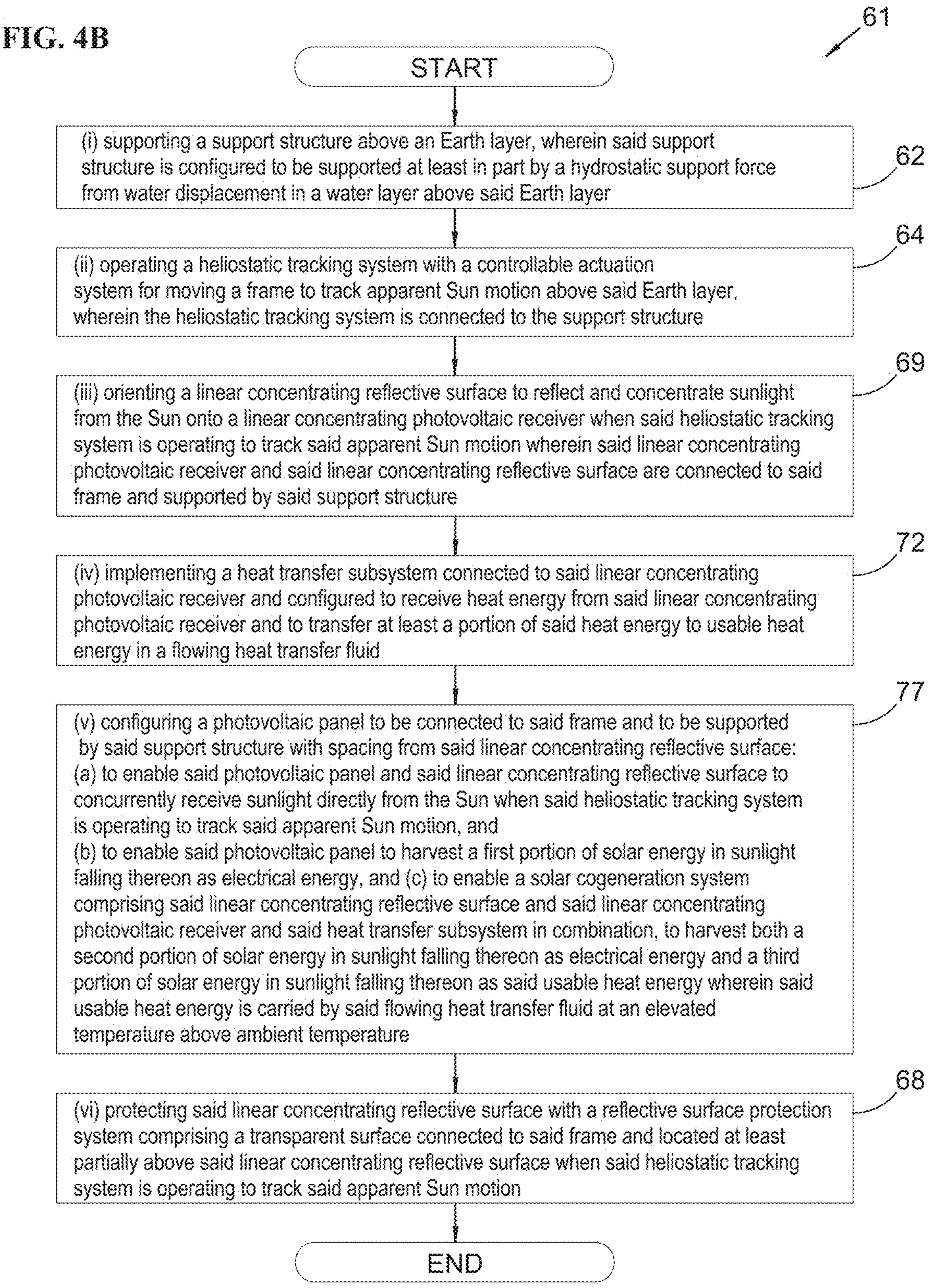

FIG. 4B illustrates method steps for implementation and/or operation of preferred embodiments of tracking integrated photovoltaic and concentrating solar energy harvesting systems such as those described in detail above with reference to FIGS. 2A-2G and 3A-3D.

More specifically, FIG. 4B shows a hybrid method of harvesting renewable energy 61 comprising the steps of:

(i) supporting 62 a support structure 2 above an Earth layer 3 wherein said support structure 2 is configured to be supported at least in part by a hydrostatic support force 27 from water displacement in a water layer 26 above said Earth layer 3;

(ii) operating 64 a heliostatic tracking system 4 with a controllable actuation system 5 for moving a frame 6 to track apparent Sun motion above said Earth layer 3, wherein the heliostatic tracking system 4 is connected to the support structure 2;

(iii) orienting 69 a linear concentrating reflective surface 9 to reflect and concentrate sunlight from the Sun onto a linear concentrating photovoltaic receiver 11 when said heliostatic tracking system 4 is operating to track said apparent Sun motion, wherein said linear concentrating photovoltaic receiver 11 and said linear concentrating reflective surface 9 are connected to said frame 6 and supported by said support structure 2;

(iv) implementing 72 a heat transfer subsystem 12 connected to said linear concentrating photovoltaic receiver 11 and configured to receive heat energy 13 from said linear concentrating photovoltaic receiver 11 and to transfer at least a portion of said heat energy 13 to usable heat energy 14 in a flowing heat transfer fluid 15;

(v) configuring 77 a photovoltaic panel 17 to be connected to said frame 6 and to be supported by said support structure 2 with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable a solar cogeneration system 7 comprising said linear concentrating reflective surface 9 and said linear concentrating photovoltaic receiver 11 and said heat transfer subsystem 12 in combination, to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A; and (vi) protecting 68 said linear concentrating reflective surface 9 with a reflective surface protection system 8 comprising a transparent surface 16 connected to said frame 6 and located at least partially above said linear concentrating reflective surface 9 when said heliostatic tracking system 4 is operating to track said apparent Sun motion.

Figure 4C:
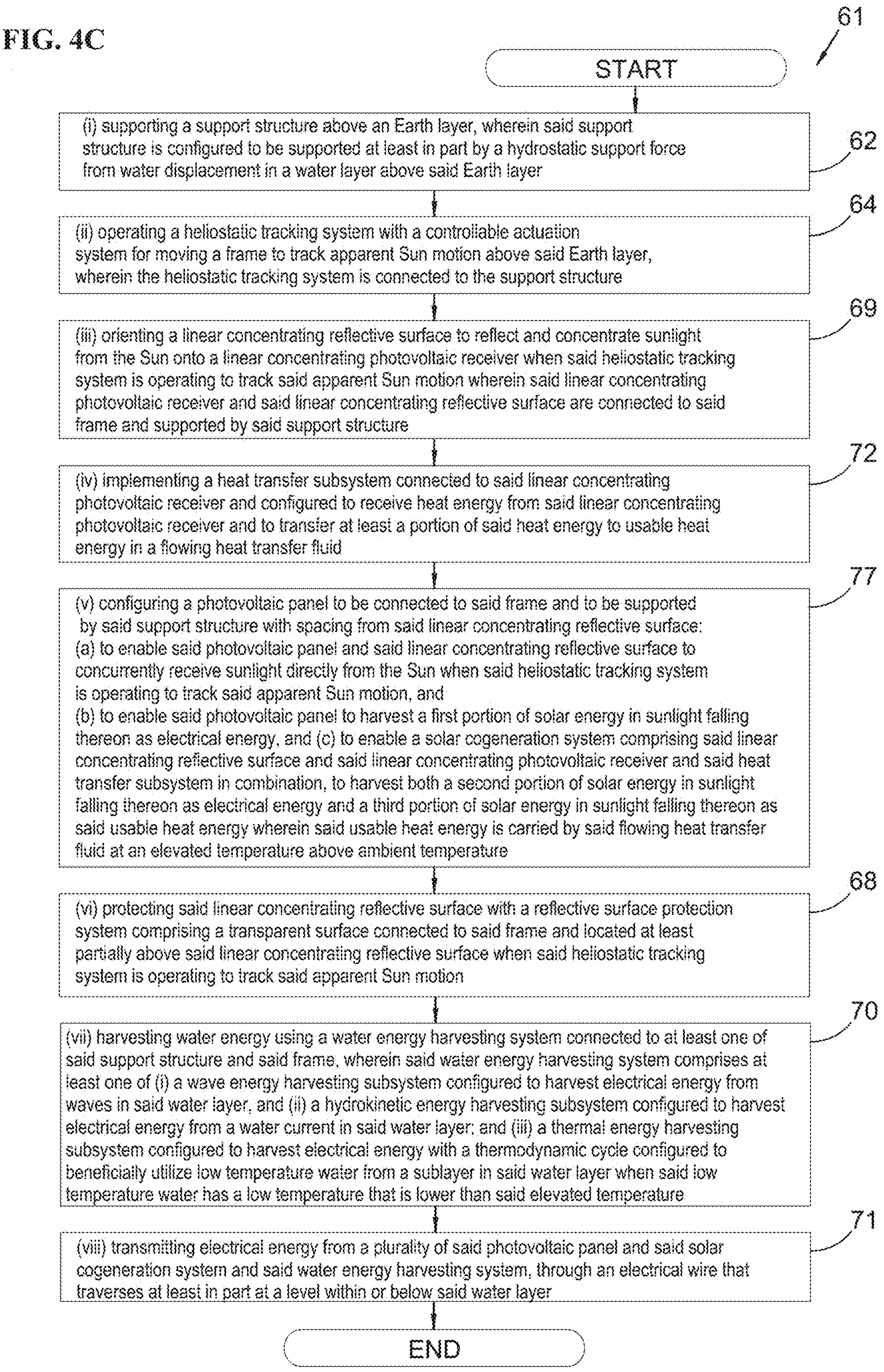

FIG. 4C illustrates method steps for implementation and/or operation of preferred embodiments of tracking integrated photovoltaic and concentrating solar energy harvesting systems such as those described in detail above with reference to FIGS. 2B-2F and 3C.

More specifically, FIG. 4C shows a hybrid method of harvesting renewable energy 61 comprising the steps of:

(i) supporting 62 a support structure 2 above an Earth layer 3 wherein said support structure 2 is configured to be supported at least in part by a hydrostatic support force 27 from water displacement in a water layer 26 above said Earth layer 3;

(ii) operating 64 a heliostatic tracking system 4 with a controllable actuation system 5 for moving a frame 6 to track apparent Sun motion above said Earth layer 3, wherein the heliostatic tracking system 4 is connected to the support structure 2;

(iii) orienting 69 a linear concentrating reflective surface 9 to reflect and concentrate sunlight from the Sun onto a linear concentrating photovoltaic receiver 11 when said heliostatic tracking system 4 is operating to track said apparent Sun motion, wherein said linear concentrating photovoltaic receiver 11 and said linear concentrating reflective surface 9 are connected to said frame 6 and supported by said support structure 2;

(iv) implementing 72 a heat transfer subsystem 12 connected to said linear concentrating photovoltaic receiver 11 and configured to receive heat energy 13 from said linear concentrating photovoltaic receiver 11 and to transfer at least a portion of said heat energy 13 to usable heat energy 14 in a flowing heat transfer fluid 15;

(v) configuring 77 a photovoltaic panel 17 to be connected to said frame 6 and to be supported by said support structure 2 with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable a solar cogeneration system 7 comprising said linear concentrating reflective surface 9 and said linear concentrating photovoltaic receiver 11 and said heat transfer subsystem 12 in combination, to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A;

(vi) protecting 68 said linear concentrating reflective surface 9 with a reflective surface protection system 8 comprising a transparent surface 16 connected to said frame 6 and located at least partially above said linear concentrating reflective surface 9 when said heliostatic tracking system 4 is operating to track said apparent Sun motion;

(vii) harvesting water energy 70 using a water energy harvesting system 28 connected to at least one of said support structure 2 and said frame 6, wherein said water energy harvesting system 28 comprises at least one of (i) a wave energy harvesting subsystem 29 configured to harvest electrical energy 18 from waves 30 in said water layer 26, and (ii) a hydrokinetic energy harvesting subsystem 31 configured to harvest electrical energy 18 from a water current 32 in said water layer 26; and (iii) a thermal energy harvesting subsystem 33 configured to harvest electrical energy 18 with a thermodynamic cycle configured to beneficially utilize low temperature water 34 from a sublayer 26S in said water layer 26 when said low temperature water 34 has a low temperature 22L that is lower than said elevated temperature 22; and (viii) transmitting 71 electrical energy 18 from a plurality of said photovoltaic panel 17 and said solar cogeneration system 7 and said water energy harvesting system 28, through an electrical wire 18W that traverses at least in part at a level within or below said water layer 26.

Figure 4D:
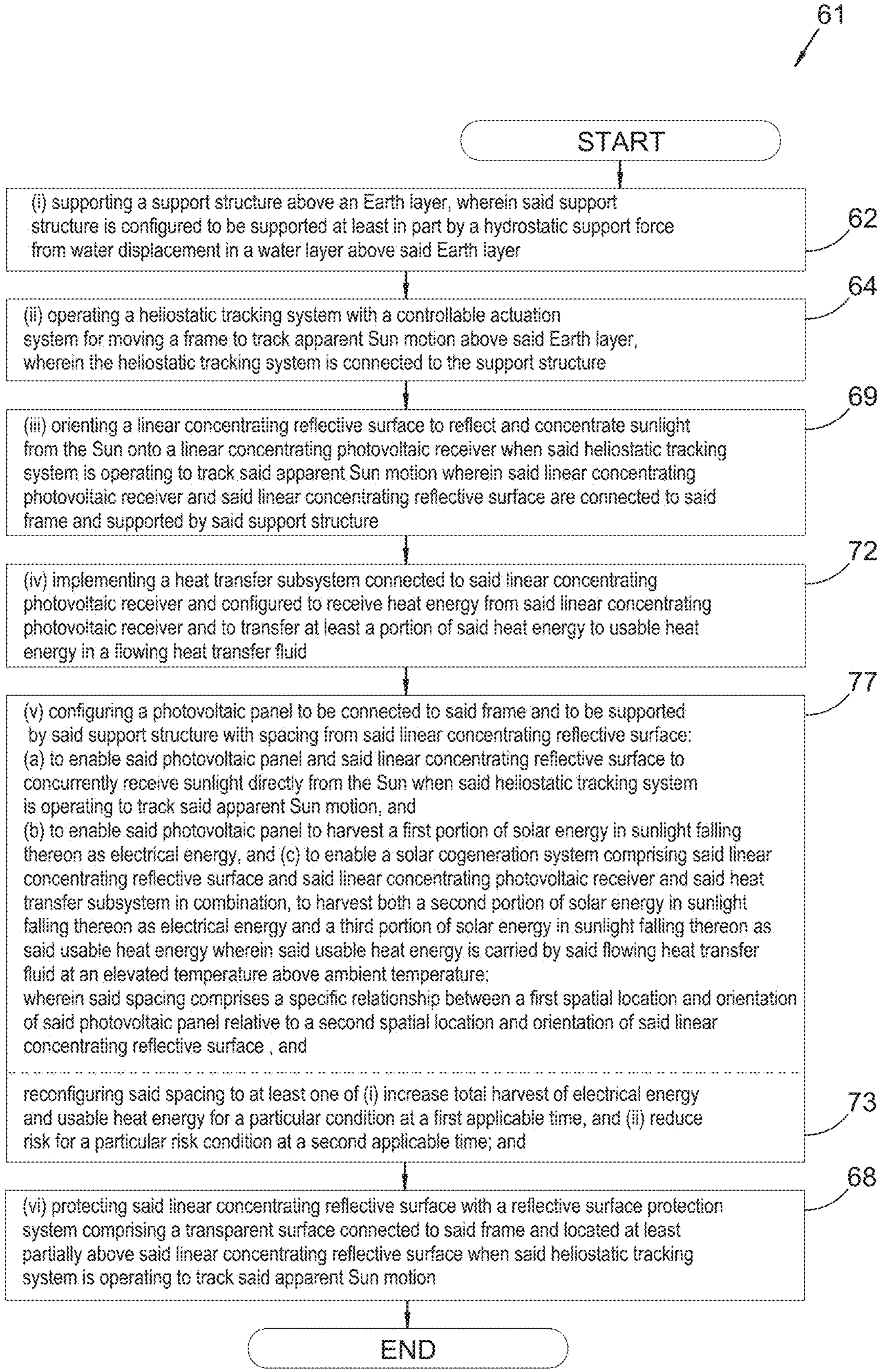

FIG. 4D illustrates method steps for implementation and/or operation of preferred embodiments of tracking integrated photovoltaic and concentrating solar energy harvesting systems such as those described in detail above with reference to FIGS. 2G, 2A-2F and 3A-3D.

More specifically, FIG. 4B shows a hybrid method of harvesting renewable energy 61 comprising the steps of:

(i) supporting 62 a support structure 2 above an Earth layer 3 wherein said support structure 2 is configured to be supported at least in part by a hydrostatic support force 27 from water displacement in a water layer 26 above said Earth layer 3;

(ii) operating 64 a heliostatic tracking system 4 with a controllable actuation system 5 for moving a frame 6 to track apparent Sun motion above said Earth layer 3, wherein the heliostatic tracking system 4 is connected to the support structure 2;

(iii) orienting 69 a linear concentrating reflective surface 9 to reflect and concentrate sunlight from the Sun onto a linear concentrating photovoltaic receiver 11 when said heliostatic tracking system 4 is operating to track said apparent Sun motion, wherein said linear concentrating photovoltaic receiver 11 and said linear concentrating reflective surface 9 are connected to said frame 6 and supported by said support structure 2;

(iv) implementing 72 a heat transfer subsystem 12 connected to said linear concentrating photovoltaic receiver 11 and configured to receive heat energy 13 from said linear concentrating photovoltaic receiver 11 and to transfer at least a portion of said heat energy 13 to usable heat energy 14 in a flowing heat transfer fluid 15;

(v) configuring 77 a photovoltaic panel 17 to be connected to said frame 6 and to be supported by said support structure 2 with spacing 17S from said linear concentrating reflective surface 9: (a) to enable said photovoltaic panel 17 and said linear concentrating reflective surface 9 to concurrently receive sunlight 10 directly from the Sun when said heliostatic tracking system 4 is operating to track said apparent Sun motion, and (b) to enable said photovoltaic panel 17 to harvest a first portion of solar energy 19 in sunlight 10 falling thereon as electrical energy 18, and (c) to enable a solar cogeneration system 7 comprising said linear concentrating reflective surface 9 and said linear concentrating photovoltaic receiver 11 and said heat transfer subsystem 12 in combination, to harvest both a second portion of solar energy 20 in sunlight 10 falling thereon as electrical energy 18 and a third portion of solar energy 21 in sunlight 10 falling thereon as said usable heat energy 14 wherein said usable heat energy 14 is carried by said flowing heat transfer fluid 15 at an elevated temperature 22 above ambient temperature 22A; wherein said spacing 17S comprises a specific relationship between a first spatial location and orientation 95 of said photovoltaic panel 17 relative to a second spatial location and orientation 96 of said solar cogeneration system 7, and further comprising (vi) a step of reconfiguring 73 said spacing 17S to at least one of (i) increase total harvest of electrical energy 18 and usable heat energy 14 for a particular condition 97 at a first applicable time 97T, and (ii) reduce risk 98 for a particular risk condition 98R at a second applicable time 98T; and (vii) protecting 68 said linear concentrating reflective surface 9 with a reflective surface protection system 8 comprising a transparent surface 16 connected to said frame 6 and located at least partially above said linear concentrating reflective surface 9 when said heliostatic tracking system 4 is operating to track said apparent Sun motion.

Figure 5:
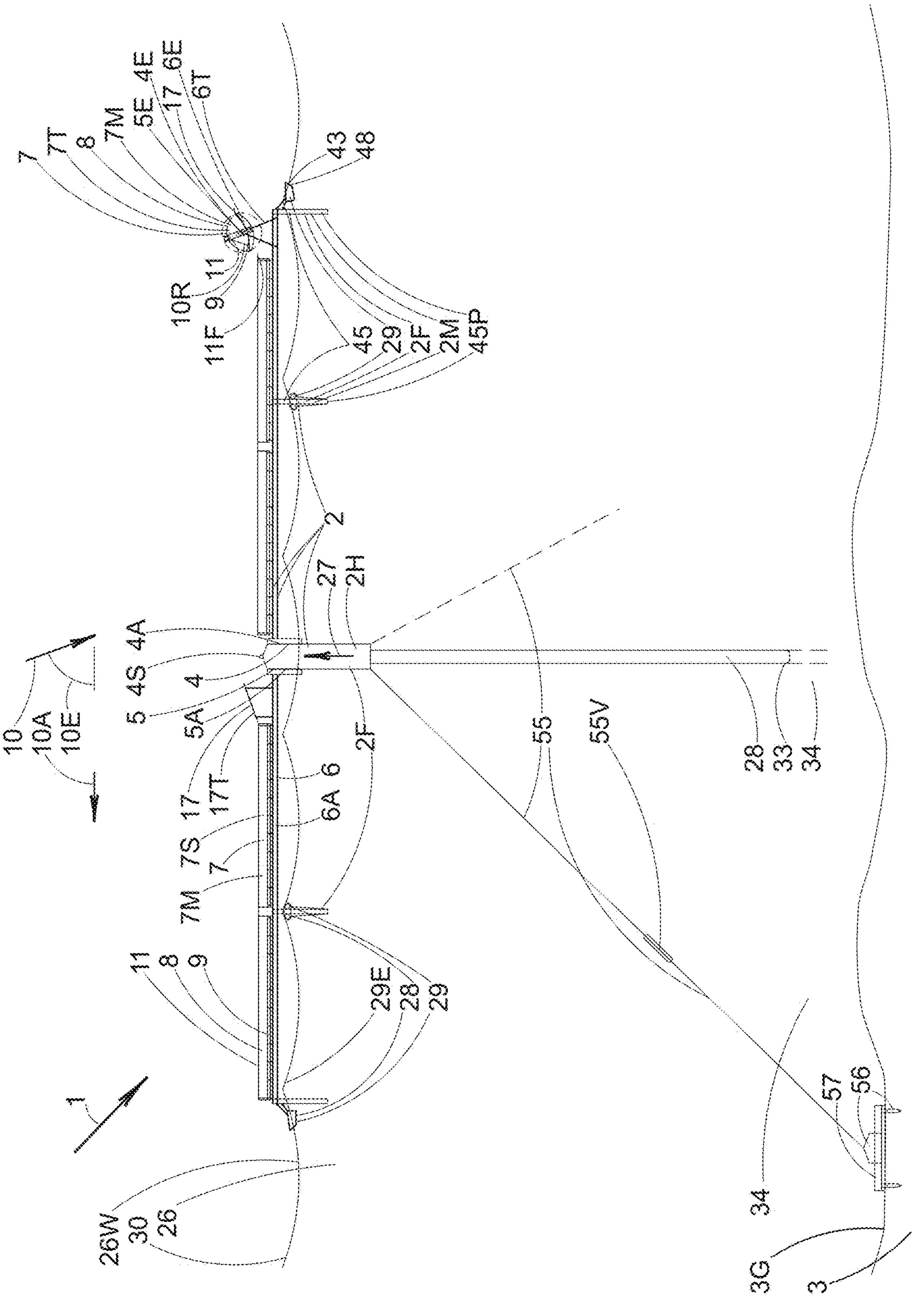
FIG. 5 shows a side sectional view of another preferred embodiment of a tracking integrated photovoltaic and concentrating solar energy harvesting system supported at least in part by a hydrostatic support force on a water layer.

FIG. 5 shows a side sectional view of another preferred embodiment of a tracking integrated photovoltaic and concentrating solar energy harvesting system supported at least in part by a hydrostatic support force 27 on a water layer 26. This is a variant preferred embodiment relative to that described in detail earlier with reference to FIG. 2E. The illustrated hybrid renewable energy harvesting system 1 in FIG. 5 comprises at least one photovoltaic panel 17 (tilted photovoltaic panel 17T illustrated, with fixed or optional adjustable or controlled variable tilt in elevation angle) and further comprises a solar cogeneration system 7 with at least one solar cogeneration module 7M. FIG. 5 shows plural solar cogeneration modules 7M that include both a solar cogeneration module with single axis tracking 7S and a solar cogeneration module with two axis tracking 7T. The hybrid renewable energy system 1 includes support structure 2 with a frame 6 including an azimuth rotating frame 6A. The hybrid renewable energy system 1 utilizes a heliostatic tracking system 4 with a heliostatic azimuth tracking subsystem 4A that uses an azimuth actuation subsystem 5A to rotate the azimuth rotating frame 6A relative to an anchored hub 2H, to track the solar azimuth angle 10A. The illustrated heliostatic tracking system 4 further comprises a heliostatic elevation tracking subsystem 4E that uses an elevation actuation system 5E to rotate the solar cogeneration module with two axis tracking 7T in elevation angle to track solar elevation angle 10E. The solar azimuth angle 10A and solar elevation angle 10E can be determined either with table lookup methods based on Sun paths for different times (year, month, day, solar time hour, minute, second etc) and geographic locations (latitude, longitude); or based on sensed Sun angles using an optional sun sensor 4S. The anchored hub 2H is anchored within a geographic and locational envelope by use of at least one tether member 55 attached to at least one Earth-fixed base 56 fixed into an Earth layer 3 with a ground surface 3G below a water layer 26. The tether member 55 may optionally be fitted with a variable extension member 55V, that may include a stretchable element, a bungee element, a spring element, and/or a damper element. The support structure 2 and frame 6 are supported at least in part by hydrostatic support force 27 acting on floatation structure 2F that includes plural floatation modules 2M, shown in inner and outer rings of water penetrating floating posts 45P, without limitation, in the illustrated preferred embodiment of FIG. 5. The support structure 2 can optionally use truss structural architecture with some allowable flex to reduce wave induced structural loads, and can also optionally use continuous or perforated horizontal panel or membrane members to reduce splash (e.g., from waves) up to solar and electrical components of the system. The use of distributed buoyancy with a combination of the inner and outer rings of water penetrating floating posts 45P (as well as the anchored hub 2H), provides an ingenious floatation structure that serves as means for contributing benefits to (i) reducing system weight and cost through the use of planform distributed support; (ii) reducing wave and water current induced loads on the structure by allowing the waves and water current to flow through spaces between the plural water penetrating floating posts 45P; (iii) reducing wave induced rocking motions of the support structure 2 and frame 6 and associated pointing errors in the heliostatic tracking system 4; and (iv) reducing actuation power needed for the azimuth actuation system 5A in rotating the entire floating assembly in azimuth angle, by configuring the ring arrangement of the water penetrating floating posts 45P to reduce water drag associated with azimuthal tracking motion of the floating assembly. FIG. 5 also illustrates a hybrid renewable energy harvesting system 1 that further comprises a water energy harvesting system 28, with a wave energy harvesting subsystem 29 (with two types of moving floats having a heave degree of freedom of motion shown) and a thermal energy harvesting subsystem 33 utilizing low temperature water 34 sourced at some depth below the floating hub 2H and transported to the surface by an insulated pipe. FIG. 5 also illustrates optional features for particular applications, with a hybrid renewable energy harvesting system 1 that further comprises a wave-reflecting member 43 and a circumscribing anti-ice system 48.

More specifically, FIG. 5 illustrates a hybrid renewable energy harvesting system 1, wherein said support structure 2 includes floatation structure 2F configured to be supported by said hydrostatic support force 27 from water displacement in said water layer 26, and wherein said heliostatic tracking system 4 comprises a heliostatic azimuth tracking subsystem 4A configured to provide azimuth heliostatic tracking with said controllable actuation system 5 comprising an azimuth actuation subsystem 5A configured to rotate said floatation structure 2F relative to an Earth-fixed base 56, and wherein said frame 6 receives support from said floatation structure 2F.

FIG. 5 also illustrates a hybrid renewable energy harvesting system 1, wherein said solar cogeneration module 7M is a solar cogeneration module with two axis tracking 7T, and wherein linear axes of said linear concentrating reflective surface 9 and of said linear concentrating photovoltaic receiver 11 are configured to be substantially aligned perpendicular to solar azimuth angle 10A by said heliostatic azimuth tracking subsystem 4A, and wherein said heliostatic tracking system 4 further comprises a heliostatic elevation tracking subsystem 4E, wherein said heliostatic elevation tracking subsystem 4E includes an elevation actuation subsystem 5E configured to control the elevation angle of said linear concentrating photovoltaic receiver 11 to substantially match solar elevation angle 10E such that said reflected and concentrated sunlight 10R falls on said linear concentrating photovoltaic receiver 11.

Figure 6:
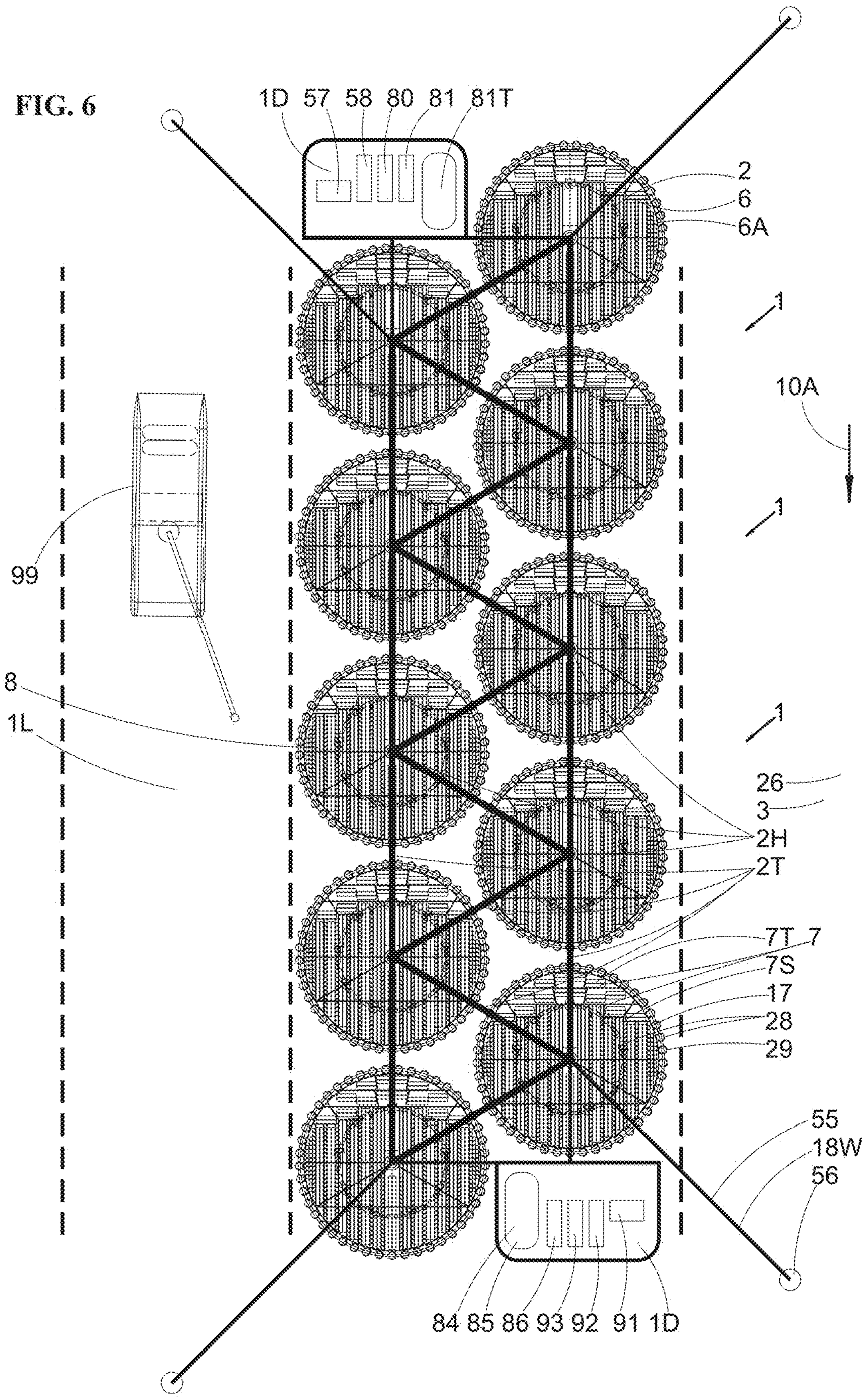
FIG. 6 shows a plan view of a connected array of floating tracking integrated photovoltaic and concentrating solar energy harvesting systems.

FIG. 6 shows a plan view of a connected array of floating tracking integrated photovoltaic and concentrating solar energy harvesting systems. Plural hybrid renewable energy systems 1 (similar to those described earlier with reference to FIG. 2C) are shown in an arrangement floating on a water layer 26, with each hybrid renewable energy system 1 including both a photovoltaic panel 17 and a solar cogeneration system 7 that can include at least one of a solar cogeneration module with single axis tracking 7S and a solar cogeneration module with two axis tracking 7T. Each hybrid renewable energy system 1 also includes support structure 2 with a frame 6 including an azimuth rotating frame 6A. A connecting truss 2T connects plural adjacent hybrid renewable energy systems 1, with a triangular grid pattern shown (and with other grid patterns such as hexagonal, square, rectangular, multi-polygon or other patterns not shown also available as alternatives for variant preferred embodiments, without limitation). The connecting truss 2T can optionally utilize underwater beam members connecting the hubs 2H, and with anchoring provided by plural tether members 55 that connect hardpoints on the connecting truss 2T with Earth-fixed bases 56, as illustrated. At least one system service lane 1L can be provided on the surface of the water layer 26, to enable a service vehicle 99 to perform service and/or assembly and/or component/assembly/subsystem/system replacement as needed for the hybrid renewable energy systems 1. The service vehicle 99 may be a crane barge or catamaran barge or multimaran barge or tugboat or service vessel, for example and without limitation. The service vehicle 99 may perform one or more of a repair, a maintenance action, and a cleaning action such as hose spraying of water to clean a reflective surface protection system 8 such as an ETFE membrane surface. The service lane 1L can also optionally be used to tow and install an entire prefabricated hybrid renewable energy system 1, by moving it to position and connecting it to a hub connection fitting on the connecting truss 2T. In the illustrated embodiment shown in FIG. 6, control and monitoring and electrical power and thermal fluid lines from the plural connected hybrid renewable energy systems 1 connect with shared infrastructure members that are also connected to the connecting truss 2T, where the illustrated shared infrastructure members include items selected from: (i) a system docking module 1D (e.g., an interface barge to which a ship, vessel, airship or VTOL aircraft can dock, to offload green hydrogen and to transport people and/or cargo and/or supplies and/or parts and/or equipment, for example and without limitation), (ii) a power management member 57 (for power conditioning, power disconnect, power transfer, power dissipation, and/or other functions), (iii) an equipment enclosure 58 (such as a bay, building, shed, secure volume, and/or other enclosure), (iv) a desalination subsystem 80, (v) a hydrogen production subsystem 81, (vi) a hydrogen tank 81T for gaseous and/or liquid/cryogenic hydrogen storage, (vii) a heat storage subsystem 84, (viii) a hot storage module 85, (ix) a district heating subsystem 86, (x) a heat pump module 93, (xi) an integrated temperature management system 92, and (xii) a cold storage module 91.

It should be understood that other features and subsystems illustrated and described earlier with reference to other preferred embodiments of the invention, can also be incorporated as shared infrastructure members, within the spirit and scope of the invention.

While certain preferred embodiments of the invention have been described in detail above with reference to the accompanying Figures, it should be understood that further variations and combinations and alternate embodiments are possible within the spirit and scope of the invention as claimed and as described herein.

REFERENCES

1. U.S. Pat. No. 7,997,264, "Inflatable Heliostatic Solar Power Collector," Inventor: Mithra Sankrithi, Filed: Jan. 10, 2007, Issued: Aug. 16, 2011
2. U.S. Pat. No. 9,404,677, "Inflatable Linear Heliostatic Concentrating Solar Module," Inventor: Mithra Sankrithi, Filed: May 17, 2010, Issued: Aug. 2, 2016

What is claimed is:

1. A hybrid renewable energy harvesting system comprising in combination:

a support structure configured to be located above an Earth layer;

a heliostatic tracking system with a controllable actuation system for moving a frame to track apparent Sun motion above said Earth layer, said heliostatic tracking system connected to said support structure;

a solar cogeneration system connected to said frame, wherein said solar cogeneration system comprises in combination: a linear concentrating reflective surface configured to face toward the Sun and receive sunlight directly from the Sun when said heliostatic tracking system is operating to track said apparent Sun motion, a linear concentrating photovoltaic receiver with a receiving side configured to at least partially face said linear concentrating reflective surface and therefrom receive reflected and concentrated sunlight from the Sun, and a heat transfer subsystem configured to receive heat energy from said linear concentrating photovoltaic receiver and to transfer at least a portion of said heat energy to usable heat energy in a flowing heat transfer fluid;

a reflective surface protection system comprising a transparent surface connected to said frame and located at least partially above said linear concentrating reflective surface when said heliostatic tracking system is operating to track said apparent Sun motion; and a photovoltaic panel connected to said frame on a back side of said linear concentrating photovoltaic receiver, which back side is substantially opposed to the receiving side of said linear concentrating photovoltaic receiver, and wherein said photovoltaic panel and said linear concentrating reflective surface are configured to both face the Sun and to both concurrently receive sunlight directly from the Sun when said heliostatic tracking system is operating to track said apparent Sun motion, (i) to enable said photovoltaic panel to harvest a first portion of solar energy in sunlight falling thereon as electrical energy, and (ii) to enable said solar cogeneration system to concurrently harvest both a second portion of solar energy in sunlight falling thereon as electrical energy and a third portion of solar energy in sunlight falling thereon as said usable heat energy wherein said usable heat energy is carried by said flowing heat transfer fluid at an elevated temperature above ambient temperature.

2. The hybrid renewable energy harvesting system of claim 1, wherein said support structure includes floatation structure configured to be supported by said hydrostatic support force from water displacement in said water layer, and wherein said heliostatic tracking system comprises a heliostatic azimuth tracking subsystem configured to provide azimuth heliostatic tracking with said controllable actuation system comprising an azimuth actuation subsystem configured to rotate said floatation structure relative to an Earth-fixed base, and wherein said frame receives support from said floatation structure.

3. The hybrid renewable energy harvesting system of claim 2, wherein said solar cogeneration module is a solar cogeneration module with two axis tracking, and wherein linear axes of said linear concentrating reflective surface and of said linear concentrating photovoltaic receiver are configured to be substantially aligned perpendicular to solar azimuth angle by said heliostatic azimuth tracking subsystem, and wherein said heliostatic tracking system further comprises a heliostatic elevation tracking subsystem, wherein said heliostatic elevation tracking subsystem includes an elevation actuation subsystem configured to control the elevation angle of said linear concentrating photovoltaic receiver to substantially match solar elevation angle such that said reflected and concentrated sunlight falls on said linear concentrating photovoltaic receiver.

4. The hybrid renewable energy harvesting system of claim 1, wherein said flowing heat transfer fluid transports said usable heat energy to at least one of: (i) a solar hot water subsystem and (ii) a building heat subsystem and (iii) a heat storage subsystem and (iv) a district heating subsystem and (v) a pool heating subsystem and (vi) a cooling subsystem utilizing said usable heat energy in conjunction with at least one of an adsorption chiller and an absorption chiller and (vii) an integrated temperature management system that further comprises at least two of a hot storage module and a cold storage module and a heat pump module and (viii) a supplemental electricity generation subsystem.

5. The hybrid renewable energy harvesting system of claim 1, wherein said support structure further comprises fittings configured to enable said support structure to be attached to at least one of a building roof and a ground surface.

6. The hybrid renewable energy harvesting system of claim 1, wherein said controllable actuation system further comprises an elevation actuation subsystem configured to enable a range of positive and negative elevation angle orientations for both (i) said linear concentrating reflective surface and (ii) said photovoltaic panel.

7. The hybrid renewable energy harvesting system of claim 1, wherein said transparent surface is at least one of a transparent membrane and a transparent flexible surface, and wherein said reflective surface protection system further comprises a transparent surface tensioning subsystem configured to maintain a tension force acting on said transparent surface, and wherein said transparent surface tensioning subsystem comprises at least one of (i) a portion of said frame comprising edge frame members configured to enable tensioned support to plural edges of said transparent surface, and (ii) an inflatable volume on at least one side of said transparent surface.

8. The hybrid renewable energy harvesting system of claim 1, wherein said photovoltaic panel connected to said frame on said back side of said linear concentrating photovoltaic receiver, which back side is substantially opposed to the receiving side of said linear concentrating photovoltaic receiver, serves as means for at least one of minimizing and precluding shadowing loss from said photovoltaic panel onto said linear concentrating reflective surface.

9. A hybrid renewable energy harvesting system comprising in combination:

a support structure configured to be supported at least in part by a hydrostatic support force arising from water displacement in a water layer above an Earth layer;

a heliostatic tracking system with a controllable actuation system for moving a frame to track apparent Sun motion above said Earth layer;

a solar cogeneration system connected to said frame and receiving support from said support structure, wherein said solar cogeneration system includes a solar cogeneration module comprising:

a linear concentrating reflective surface configured to face toward the Sun and receive sunlight directly from the Sun when said heliostatic tracking system is operating to track said apparent Sun motion, a linear concentrating photovoltaic receiver configured to at least partially face said linear concentrating reflective surface and therefrom receive reflected and concentrated sunlight from the Sun, and a heat transfer subsystem configured to receive heat energy from said linear concentrating photovoltaic receiver and to transfer at least a portion of said heat energy to usable heat energy in a flowing heat transfer fluid; and a photovoltaic panel connected to said frame and configured to receive sunlight directly from the Sun when said heliostatic tracking system is operating to track said apparent Sun motion, said photovoltaic panel configured with spacing from said linear concentrating reflective surface: (a) to enable said photovoltaic panel and said linear concentrating reflective surface to concurrently receive sunlight directly from the Sun when said heliostatic tracking system is operating to track said apparent Sun motion, and (b) to enable said photovoltaic panel to harvest a first portion of solar energy in sunlight falling thereon as electrical energy, and (c) to enable said solar cogeneration system to harvest both a second portion of solar energy in sunlight falling thereon as electrical energy and a third portion of solar energy in sunlight falling thereon as said usable heat energy wherein said usable heat energy is carried by said flowing heat transfer fluid at an elevated temperature above ambient temperature;

wherein said support structure includes floatation structure configured to be supported by said hydrostatic support force from water displacement in said water layer, and wherein said heliostatic tracking system comprises a heliostatic azimuth tracking subsystem configured to provide azimuth heliostatic tracking with said controllable actuation system comprising an azimuth actuation subsystem configured to rotate said floatation structure relative to an Earth-fixed base, and wherein said frame receives support from said floatation structure; and wherein said solar cogeneration module is a single-axis tracking solar cogeneration module with single axis tracking, and wherein linear axes of said linear concentrating reflective surface and of said linear concentrating photovoltaic receiver are configured to be substantially aligned parallel to solar azimuth angle by said heliostatic azimuth tracking subsystem, and wherein at least one of (i) a tilted solar panel and (ii) a linear concentrating photovoltaic receiver of a two-axis tracking solar cogeneration system with its elevation tracking axis substantially normal to solar azimuth angle, is located on said support structure at a height greater than and location in an opposite to sunward azimuthal direction relative to said single-axis tracking solar cogeneration module, thus configured to enable concurrent solar energy harvest by all panels and receivers while at least one of minimizing and precluding shadowing loss.

10. The hybrid renewable energy harvesting system of claim 9, wherein said support structure includes floatation structure comprising plural floatation modules and at least one motion permitting connection member connecting two adjacent floatation modules.

11. The hybrid renewable energy harvesting system of claim 9, wherein said frame further comprises a suspension member configured to be controlled at least in part by said heliostatic tracking system to reduce heliostatic tracking error induced by motion of water in said water layer.

12. The hybrid renewable energy harvesting system of claim 9, further comprising:

at least one of a wind turbine and a water energy harvesting system, connected to at least one of said support structure and said frame, said water energy harvesting system comprising at least one of (i) a wave energy harvesting subsystem configured to harvest electrical energy from waves in said water layer, and (ii) a hydrokinetic energy harvesting subsystem configured to harvest electrical energy from a water current in said water layer; and (iii) a thermal energy harvesting subsystem configured to harvest electrical energy with a thermodynamic cycle configured to beneficially utilize low temperature water from a sublayer in said water layer when said low temperature water has a low temperature that is lower than said elevated temperature;

and wherein said water energy harvesting system is configured with first spacing from said solar cogeneration system and second spacing from said photovoltaic panel such that a shadow volume cast by sunlight falling on said water energy harvesting system directly from the Sun is characterized by a downwardly progressing volume that does not block sunlight from being received directly from the Sun by either said linear concentrating reflective surface or said photovoltaic panel.

13. The hybrid renewable energy harvesting system of claim 9, further comprising:

a wave response reduction system configured to reduce a root-mean-square wave-induced pointing error affecting said reflected and concentrated sunlight from the Sun when said heliostatic tracking system is tracking said apparent Sun motion, relative to a reference root-mean-square wave-induced pointing error that would occur if the support structure comprised a toroidal float circumscribing said solar cogeneration system in plan view, wherein the equatorial plane of said toroidal float approximately coincides with the mean surface plane of said water layer;

and wherein said wave response reduction system comprises at least one of (i) an absorber moving member configured to absorb at least some wave energy from a wave in an upper sublayer of said water layer and (ii) a wave-reflecting member configured to reflect a wave carrying at least some wave energy and (iii) and a suspension subsystem (iv) a floatation subsystem portion of said support structure wherein said floatation subsystem comprises plural penetration members projecting relative to said frame downwardly into the upper sublayer of said water layer, with lower portions of at least some of said plural penetration members connecting to at least one underwater buoyancy member.

14. A hybrid renewable energy harvesting system comprising in combination:

a support structure configured to be supported at least in part by a hydrostatic support force arising from water displacement in a water layer above an Earth layer;

a heliostatic tracking system with a controllable actuation system for moving a frame to track apparent Sun motion above said Earth layer;

a solar cogeneration system connected to said frame and receiving support from said support structure, wherein said solar cogeneration system includes a solar cogeneration module comprising:

a linear concentrating reflective surface configured to face toward the Sun and receive sunlight directly from the Sun when said heliostatic tracking system is operating to track said apparent Sun motion, a linear concentrating photovoltaic receiver configured to at least partially face said linear concentrating reflective surface and therefrom receive reflected and concentrated sunlight from the Sun, and a heat transfer subsystem configured to receive heat energy from said linear concentrating photovoltaic receiver and to transfer at least a portion of said heat energy to usable heat energy in a flowing heat transfer fluid; and a photovoltaic panel connected to said frame and configured to receive sunlight directly from the Sun when said heliostatic tracking system is operating to track said apparent Sun motion, said photovoltaic panel configured with spacing from said linear concentrating reflective surface: (a) to enable said photovoltaic panel and said linear concentrating reflective surface to concurrently receive sunlight directly from the Sun when said heliostatic tracking system is operating to track said apparent Sun motion, and (b) to enable said photovoltaic panel to harvest a first portion of solar energy in sunlight falling thereon as electrical energy, and (c) to enable said solar cogeneration system to harvest both a second portion of solar energy in sunlight falling thereon as electrical energy and a third portion of solar energy in sunlight falling thereon as said usable heat energy wherein said usable heat energy is carried by said flowing heat transfer fluid at an elevated temperature above ambient temperature;

wherein said support structure includes floatation structure configured to be supported by said hydrostatic support force from water displacement in said water layer, and wherein said heliostatic tracking system comprises a heliostatic azimuth tracking subsystem configured to provide azimuth heliostatic tracking with said controllable actuation system comprising an azimuth actuation subsystem configured to rotate said floatation structure relative to an Earth-fixed base, and wherein said frame receives support from said floatation structure; and wherein said solar cogeneration module is a solar cogeneration module with single axis tracking, and wherein linear axes of said linear concentrating reflective surface and of said linear concentrating photovoltaic receiver are configured to be substantially aligned parallel to solar azimuth angle by said heliostatic azimuth tracking subsystem, and wherein said linear photovoltaic receiver includes at least one of a fixed extension and a variable extension in an opposite to sunward azimuthal direction to enable reduced-loss energy harvest from said reflected and concentrated sunlight when solar elevation angle is less than 90 degrees.

15. The hybrid renewable energy harvesting system of claim 14, further comprising:

at least one of a wind turbine and a water energy harvesting system, connected to at least one of said support structure and said frame, said water energy harvesting system comprising at least one of (i) a wave energy harvesting subsystem configured to harvest electrical energy from waves in said water layer, and (ii) a hydrokinetic energy harvesting subsystem configured to harvest electrical energy from a water current in said water layer; and (iii) a thermal energy harvesting subsystem configured to harvest electrical energy with a thermodynamic cycle configured to beneficially utilize low temperature water from a sublayer in said water layer when said low temperature water has a low temperature that is lower than said elevated temperature;

and wherein said water energy harvesting system is configured with first spacing from said solar cogeneration system and second spacing from said photovoltaic panel such that a shadow volume cast by sunlight falling on said water energy harvesting system directly from the Sun is characterized by a downwardly progressing volume that does not block sunlight from being received directly from the Sun by either said linear concentrating reflective surface or said photovoltaic panel.

16. The hybrid renewable energy harvesting system of claim 14, further comprising:

a wave response reduction system configured to reduce a root-mean-square wave-induced pointing error affecting said reflected and concentrated sunlight from the Sun when said heliostatic tracking system is tracking said apparent Sun motion, relative to a reference root-mean-square wave-induced pointing error that would occur if the support structure comprised a toroidal float circumscribing said solar cogeneration system in plan view, wherein the equatorial plane of said toroidal float approximately coincides with the mean surface plane of said water layer;

and wherein said wave response reduction system comprises at least one of (i) an absorber moving member configured to absorb at least some wave energy from a wave in an upper sublayer of said water layer and (ii) a wave-reflecting member configured to reflect a wave carrying at least some wave energy and (iii) a suspension subsystem and (iv) a floatation subsystem portion of said support structure wherein said floatation subsystem comprises plural penetration members projecting relative to said frame downwardly into the upper sublayer of said water layer, with lower portions of at least some of said plural penetration members connecting to at least one underwater buoyancy member.

17. The hybrid renewable energy harvesting system of claim 14, wherein said frame includes a buoyant perimeter structure, and further comprising a circumscribing anti-ice system that is connected to said buoyant perimeter structure, which circumscribing anti-ice system at least one of: (a) prevents surface ice formation on top of said water layer in a ring region around said buoyant perimeter structure and (b) effaces surface ice on top of said water layer in said ring region around said buoyant perimeter structure.

18. The hybrid renewable energy harvesting system of claim 14, wherein said photovoltaic panel is laterally spaced from said linear concentrating reflective surface.

19. The hybrid renewable energy harvesting system of claim 14, wherein said flowing heat transfer fluid transports said usable heat energy to at least one of: (i) a desalination subsystem and (ii) a hydrogen production subsystem.

20. The hybrid renewable energy harvesting system of claim 14, wherein said spacing comprises a specific relationship between a first spatial location and orientation of said photovoltaic panel relative to a second spatial location and orientation of said solar cogeneration system, and further comprising means for reconfiguring said spacing to at least one of (i) increase total harvest of electrical energy and usable heat energy for a particular condition at a first applicable time, and (ii) reduce risk for a particular risk condition at a second applicable time.

* * * * *